United States Patent
Lee et al.

(10) Patent No.: US 11,623,545 B2
(45) Date of Patent: Apr. 11, 2023

(54) VEHICLE CONTROL APPARATUS DISPOSED IN VEHICLE AND CONTROL METHOD OF VEHICLE

(71) Applicant: LG Electronics Inc., Seoul (KR)

(72) Inventors: Kyoungha Lee, Seoul (KR); Jungbin Yim, Seoul (KR); Inyoung Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 698 days.

(21) Appl. No.: 16/608,131

(22) PCT Filed: Jun. 15, 2017

(86) PCT No.: PCT/KR2017/006257
§ 371 (c)(1),
(2) Date: Oct. 24, 2019

(87) PCT Pub. No.: WO2018/199380
PCT Pub. Date: Nov. 1, 2018

(65) Prior Publication Data
US 2020/0164770 A1    May 28, 2020

(30) Foreign Application Priority Data

Apr. 24, 2017 (KR) .......... 10-2017-0052518

(51) Int. Cl.
*B60N 2/20* (2006.01)
*B60N 2/02* (2006.01)
(Continued)

(52) U.S. Cl.
CPC ........... *B60N 2/0224* (2013.01); *B60N 2/002* (2013.01); *B60N 2/20* (2013.01); *B60Q 3/233* (2017.02);
(Continued)

(58) Field of Classification Search
CPC ........ G06V 20/56; B60Q 3/233; B60N 2/829; B60N 2/853; B60N 2/20; B60N 2/0224; B60N 2/002
See application file for complete search history.

(56) References Cited

U.S. PATENT DOCUMENTS 9,477,894 B1 * 10/2016 Reed .................... G06V 20/586
9,987,961 B2 * 6/2018 Zouzal ................... B60N 2/002
(Continued)

FOREIGN PATENT DOCUMENTS

JP          2009125276       6/2009
KR       20140128806      11/2014
(Continued)

OTHER PUBLICATIONS

Office Action in Korean Appln. No. 10-2017-0052518, dated Sep. 28, 2021, 8 pages (with English translation).

*Primary Examiner* — Syed A Islam
(74) *Attorney, Agent, or Firm* — Fish & Richardson P.C.

(57) ABSTRACT

The present disclosure relates to a vehicle control apparatus disposed in a vehicle and a control method of the vehicle. A vehicle control apparatus according to one embodiment of the present disclosure is a vehicle control apparatus disposed in a vehicle, and comprises: a camera for capturing an image of an object which approaches the vehicle; a seat driving unit for driving a seat disposed in the vehicle; and a processor for sensing information related to the object on the basis of the image captured through the camera and controlling the seat driving unit such that the seat is disposed at a predetermined position, on the basis of the sensed information related to the object.

19 Claims, 21 Drawing Sheets

(51) Int. Cl.
*B60Q 3/233* (2017.01)
*B60N 2/00* (2006.01)
*B60R 16/037* (2006.01)
*G06V 20/56* (2022.01)

(52) U.S. Cl.
CPC ............ *B60R 16/037* (2013.01); *G06V 20/56* (2022.01); *B60N 2002/0268* (2013.01)

(56) References Cited

U.S. PATENT DOCUMENTS

| | | | |
|---|---|---|---|
| 11,117,534 B2* | 9/2021 | Coburn | H04W 4/40 |
| 2009/0129105 A1* | 5/2009 | Kusu | B60Q 3/233 |
| | | | 362/464 |
| 2014/0319895 A1* | 10/2014 | Lange-Mao | G01S 17/86 |
| | | | 297/463.1 |
| 2015/0210287 A1* | 7/2015 | Penilla | G06F 3/04842 |
| | | | 701/49 |
| 2018/0029548 A1* | 2/2018 | Coburn | B60R 16/037 |
| 2018/0099609 A1* | 4/2018 | Salter | B60Q 3/233 |
| 2018/0181359 A1* | 6/2018 | Monroe | B60Q 3/51 |
| 2018/0236975 A1* | 8/2018 | Myers | G06V 40/193 |

FOREIGN PATENT DOCUMENTS

| | | |
|---|---|---|
| KR | 20150042476 | 4/2015 |
| KR | 20170042142 | 4/2017 |
| WO | WO2017064534 | 4/2017 |

* cited by examiner

FIG. 1
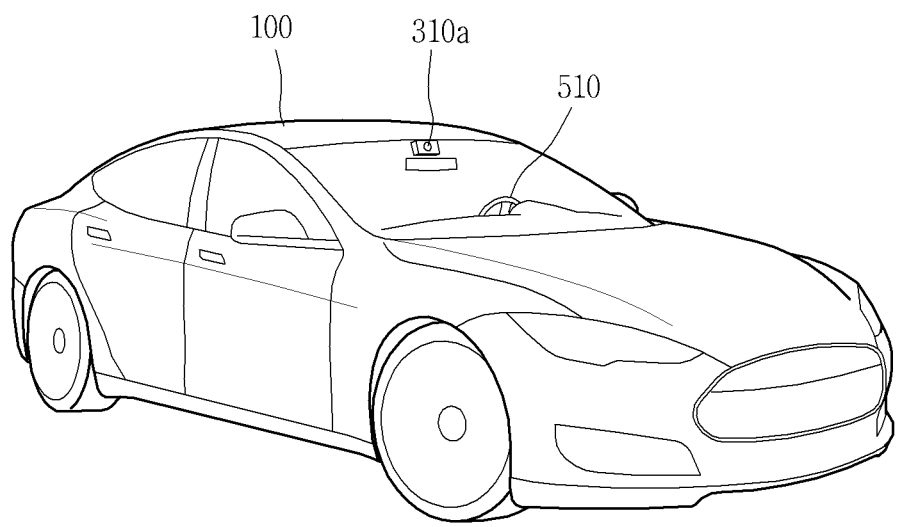
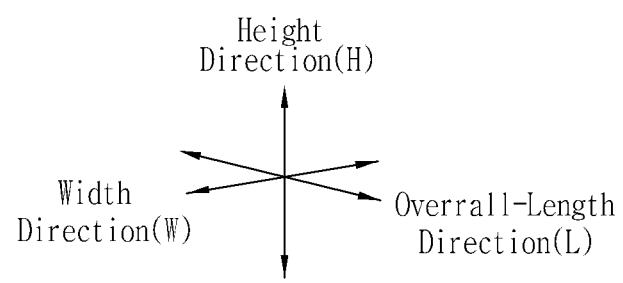

FIG. 11
(a)
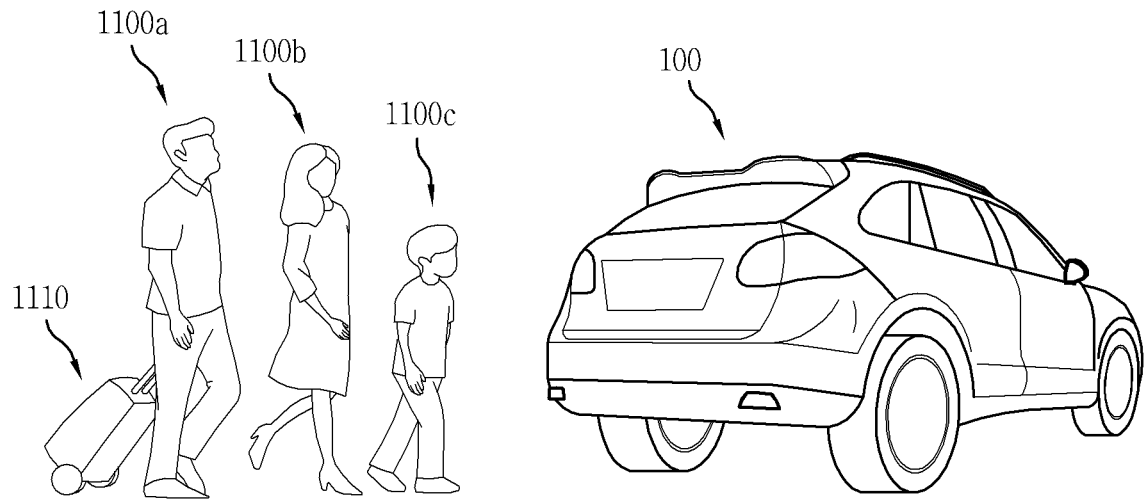
(b)
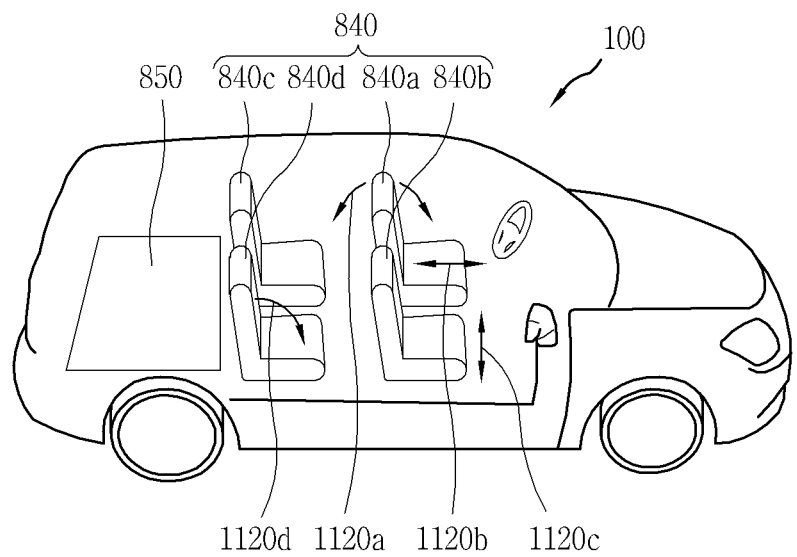

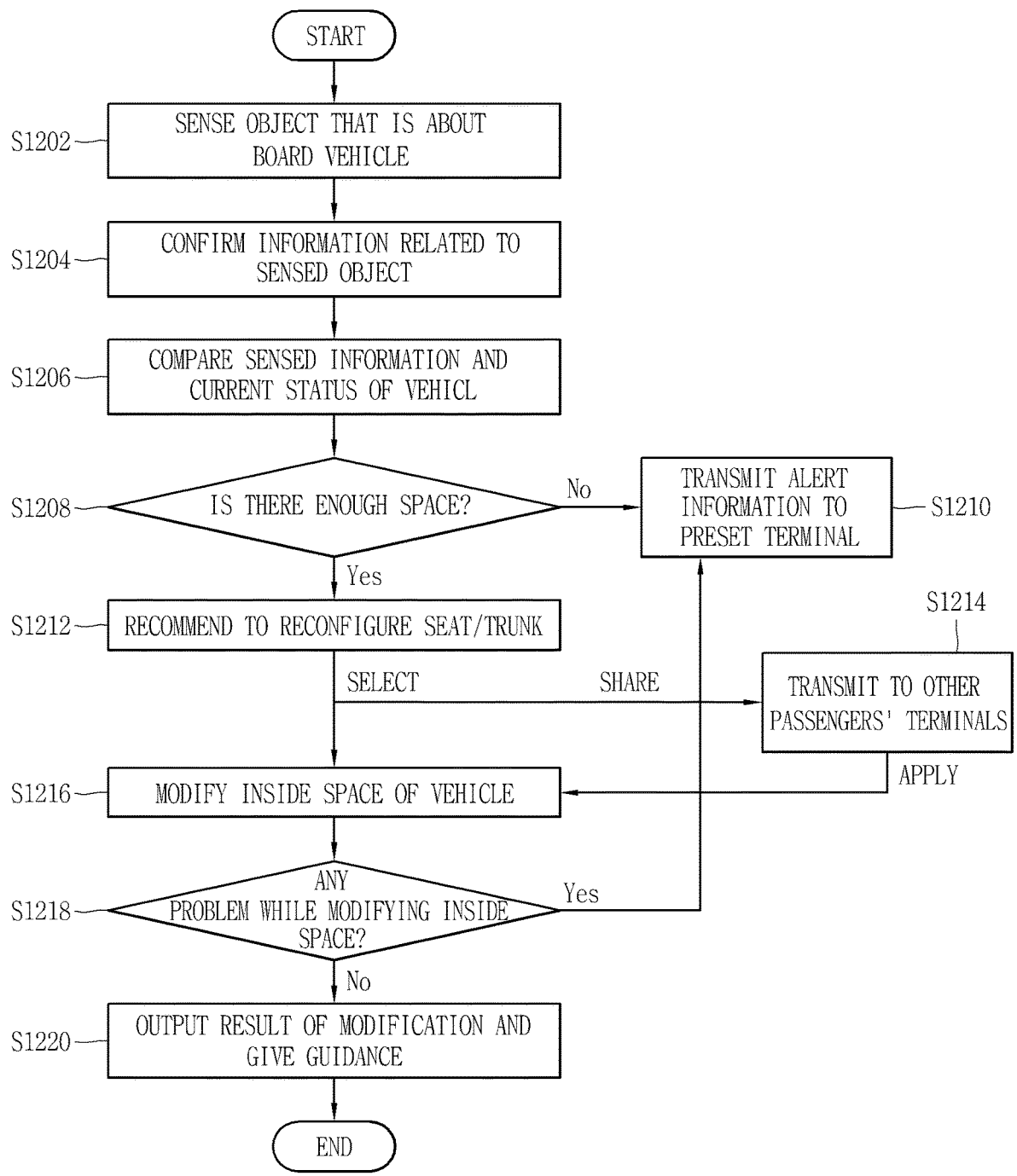

FIG. 13A
(a)
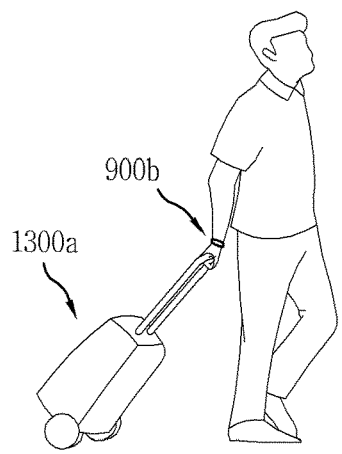
(b)
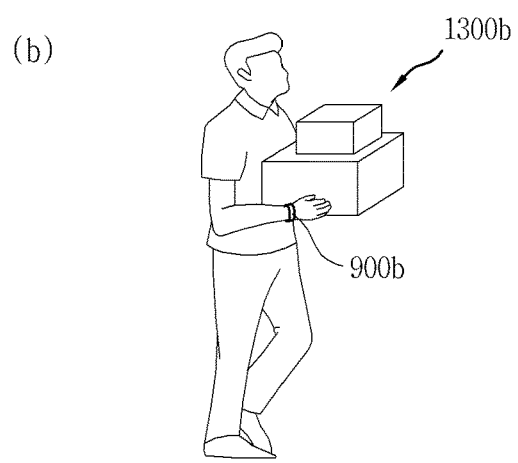
(c)
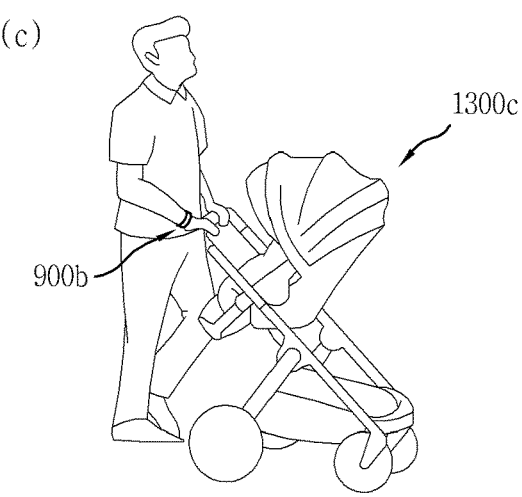

FIG. 13C
(a)
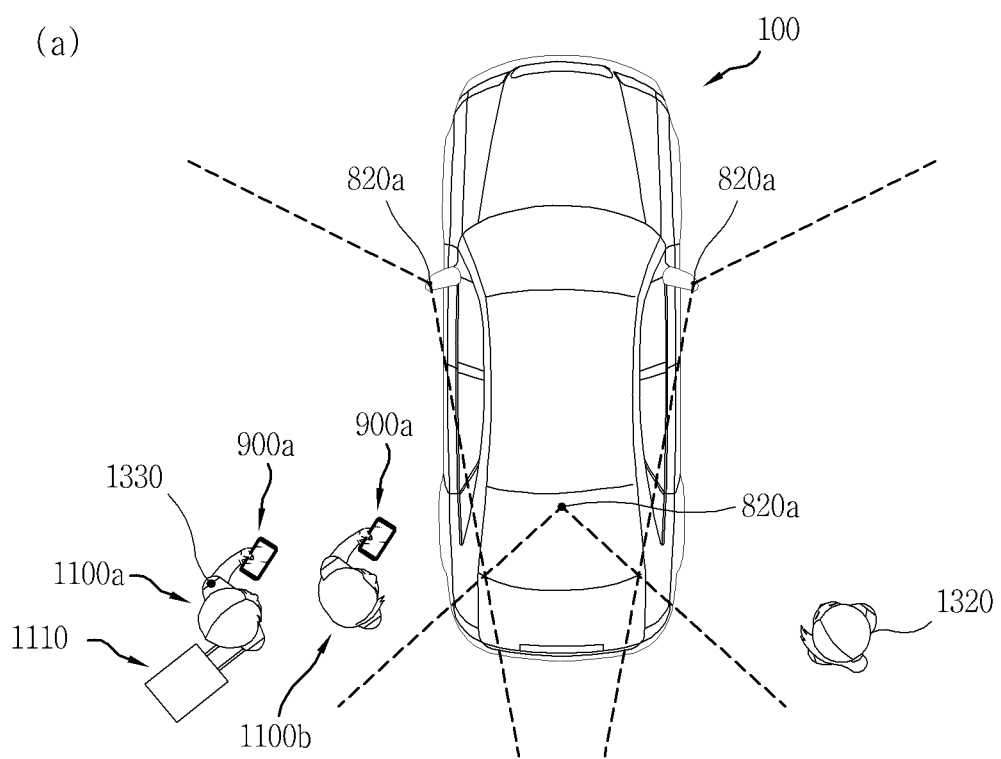
(b)
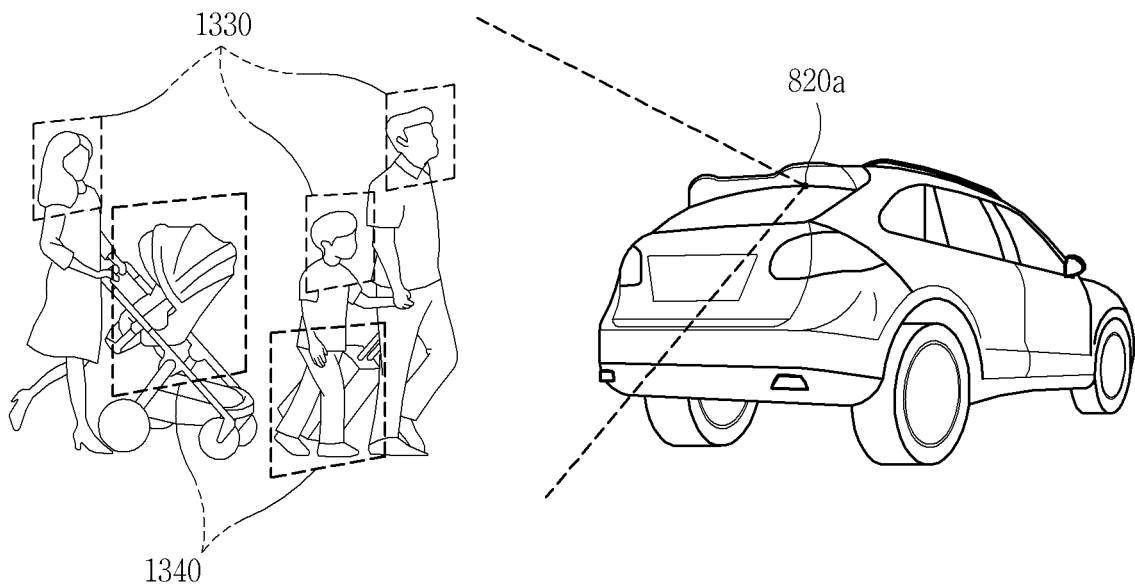

FIG. 16
(a)
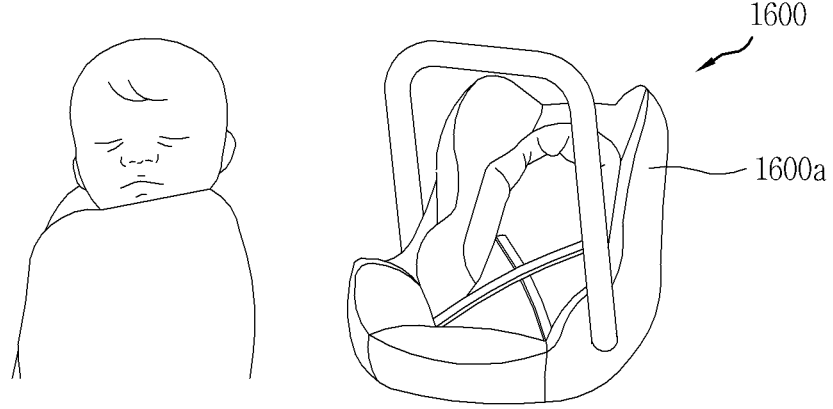
(b)
(c)
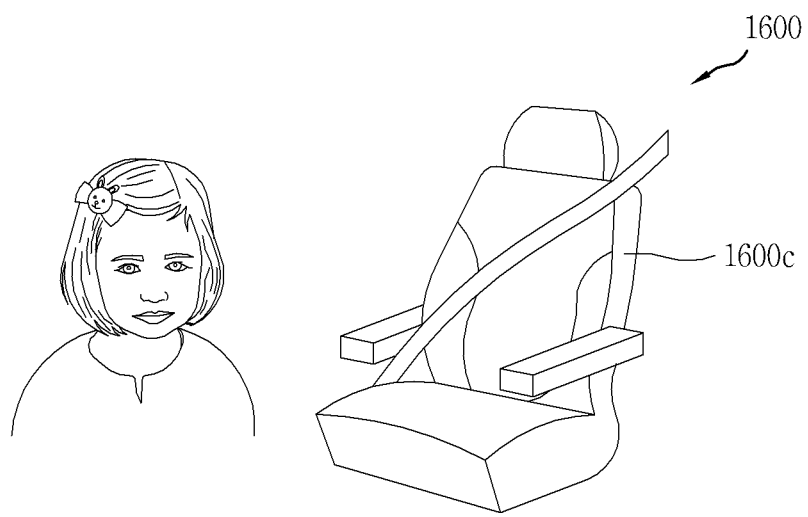

FIG. 19
(a)
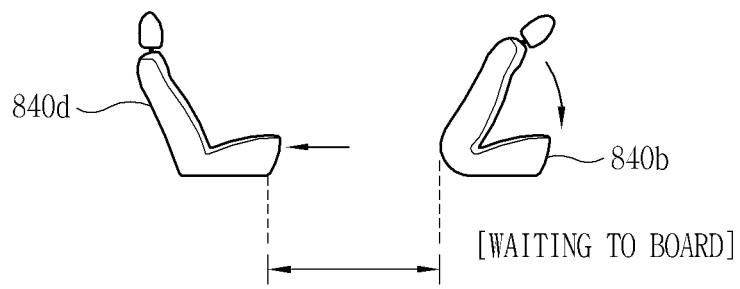
[WAITING TO BOARD]
(b)
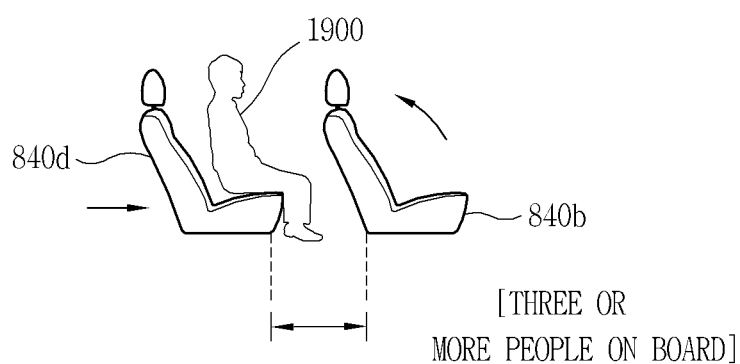
[THREE OR MORE PEOPLE ON BOARD]
(c)
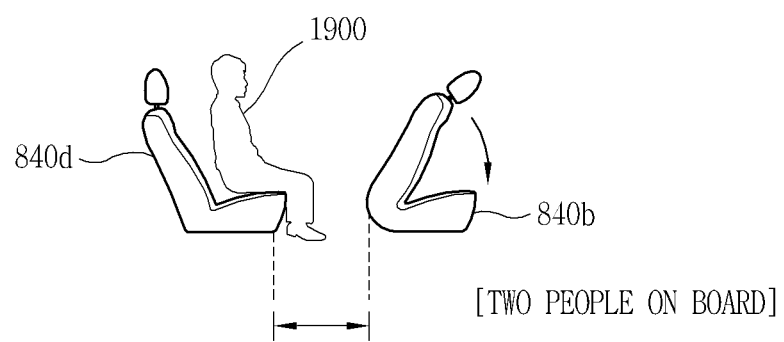
[TWO PEOPLE ON BOARD]

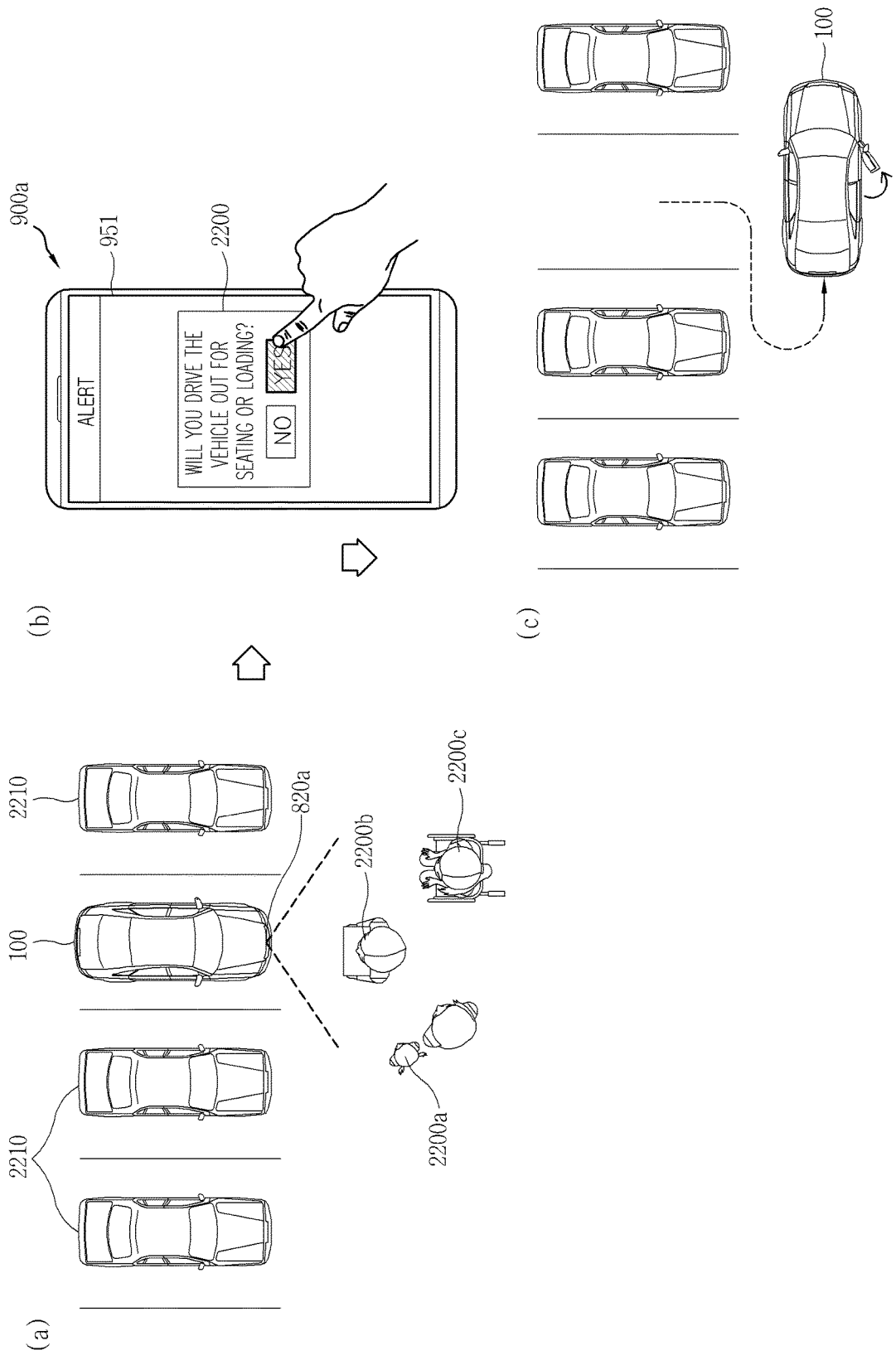

VEHICLE CONTROL APPARATUS DISPOSED IN VEHICLE AND CONTROL METHOD OF VEHICLE

CROSS-REFERENCE TO RELATED APPLICATIONS

This application is the National Stage filing under 35 U.S.C. 371 of International Application No. PCT/KR2017/006257, filed on Jun. 15, 2017, which claims the benefit of earlier filing date and right of priority to Korean Application No. 10-2017-0052518, filed on Apr. 24, 2017. The disclosures of the prior applications are incorporated by reference in their entirety.

TECHNICAL FIELD

The present disclosure relates to a vehicle control apparatus (or device) provided in a vehicle and a method for controlling the vehicle.

BACKGROUND ART

A vehicle is an apparatus capable of moving a user in the user-desired direction. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience while driving a vehicle is required.

As part of this, the development of technologies for controlling a vehicle by using a mobile terminal is actively being done, driven by the technological development of various UIs/UXs (user interfaces/user experiences) between a mobile terminal and a vehicle.

DISCLOSURE OF THE INVENTION

Therefore, an object of the present disclosure is to provide a vehicle control apparatus capable of controlling a vehicle's seat in an optimal manner and a method for controlling the vehicle.

Another object of the present disclosure is to provide a vehicle control apparatus capable of placing a vehicle's seat in an optimal position by using a mobile terminal and a method for controlling the vehicle.

Technical problems to be solved by the present disclosure are not limited to the above-mentioned technical problems, and other technical problems not mentioned herein may be clearly understood by those skilled in the art from description below.

An exemplary embodiment of the present disclosure provides a vehicle control apparatus (or device) provided in a vehicle, comprising: a camera for capturing an object approaching the vehicle; a seat driving (or manipulating) unit for manipulating a seat provided in the vehicle; and a processor for sensing information related to the object on the basis of an image captured by the camera and controlling the seat driving unit such that the seat is placed in a preset position on the basis of the sensed information related to the object.

In the embodiment, the seat driving unit manipulates the seat in such a way as to move the seat forward or backward, move the seat upward or downward, tilt the backrest of the seat, or fold or unfold the seat.

In the embodiment, the information related to the object comprises information such as the number of objects approaching the vehicle, the types of the objects, and the volumes of the objects, wherein the processor controls the seat driving unit such that at least one among the position of the seat, the posture of the seat, and the shape of the seat is changed based on the information related to the object.

In the embodiment, the seat comprises a plurality of seats, the processor determines at least one among the position, posture, and shape of each of the plurality of seats based on the information related to the object, and the seat driving unit manipulates the plurality of seats so as to correspond to at least one among the determined position, posture, and shape.

In the embodiment, the processor switches on a lamp on the vehicle in a preset manner while the seat is being manipulated.

In the embodiment, the lamp on the vehicle is configured to display certain information, and, if the seat is being manipulated, the processor displays information on the lamp to indicate that the seat is being configured.

In the embodiment, the lamp on the vehicle outputs light to display certain information on a road surface, and, if the seat is being manipulated, the processor controls the lamp to display information on the road surface to indicate that the seat is being configured.

In the embodiment, upon sensing that the seat cannot be placed in the preset position, the processor switches on the lamp in a preset pattern.

In the embodiment, the vehicle control apparatus further comprises a communication unit for communicating with a mobile terminal.

In the embodiment, when an object approaches the vehicle, the processor transmits information related to the sensed object to the mobile terminal through the communication unit, wherein the information related to the object and at least one seating plan corresponding to the information related to the object are outputted to a display of the mobile terminal.

In the embodiment, a graphics object associated with a function for outputting a plurality of different seating plans is outputted to the display of the mobile terminal, and, when the graphics object is selected, a plurality of seating plans are outputted to the display of the mobile terminal.

In the embodiment, upon receiving information on a seating plan selected from the display of the mobile terminal through the communication unit, the processor controls the seat driving unit such that a seat in the vehicle is placed in a position corresponding to the selected seating plan.

In the embodiment, the camera comprises internal cameras configured to capture the inside of the vehicle, and the processor senses a loading space inside the vehicle on the basis of images captured by the internal cameras and controls the seat driving unit such that the seat is placed in a preset position based on the loading space and the information related to the object.

In the embodiment, if it is determined that an object approaching the vehicle cannot be loaded in its entirety, based on the information related to the object and the loading space, the processor transmits alert information including a determination result to the mobile terminal through the communication unit.

In the embodiment, if an object with variable volume is included in an image captured by the camera, the processor determines whether the object can be loaded in its entirety or not, based on the minimum volume of the object.

In the embodiment, if there is a record showing that the mobile terminal has ever been connected through the communication unit, the processor places the seat in a seat position where the user carrying the mobile terminal once sat.

In the embodiment, when a door of the vehicle closes after the object boards the vehicle, the processor determines whether there is an object left outside the vehicle by the camera, and, if there is an object left, transmits an image captured by the camera to the mobile terminal through the communication unit to display the image on the mobile terminal.

In the embodiment, if objects approaching the vehicle include a preset object, and there is a space within a certain distance from the vehicle's door or trunk, the processor transmits information to the mobile terminal to ask whether to autonomously drive the vehicle in a preset manner or not and autonomously drives the vehicle based on a response from the mobile terminal.

In the embodiment, the processor allows the backrest of a second seat to be tilted in one direction before a door of the vehicle opens, the second seat being positioned in front of a first seat set up to seat a user, and, once the user sits in the first seat, the processor returns the backrest of the second seat to the original position or keep the same tilted, based on the preset position.

A vehicle related to the present disclosure comprises the vehicle control apparatus explained in this specification.

Details of Other embodiments are included in the following detailed description and the accompanying drawings.

Advantageous Effects

Embodiments of the present disclosure provide one or more of the following advantages.

Firstly, the present disclosure has the advantage of providing a vehicle control apparatus capable of placing a vehicle's seat in an optimal position depending on the object that is about to board the vehicle, and a method for controlling the vehicle.

Secondly, the present disclosure may suggest an optimized seating plan to a user through a mobile terminal depending on the object that is about to board the vehicle, and provide a novel user interface that allows a user to configure a seat through the mobile terminal according to the seating plan the user wants.

It is to be understood that advantageous effects to be achieved by the present disclosure are not limited to the aforementioned advantageous effects and other advantageous effects which are not mentioned herein will be apparent from the following description to one of ordinary skill in the art to which the present disclosure pertains.

BRIEF DESCRIPTION OF THE DRAWINGS

FIG. 1 is a view illustrating appearance of a vehicle in accordance with an embodiment of the present disclosure.

FIG. 11 is a conceptual diagram for explaining the control method illustrated in FIG. 10.

FIG. 12 is a flowchart for explaining a control method for changing the position of a seat by using a mobile terminal in accordance with an exemplary embodiment of the present disclosure.

FIGS. 13A, 13B, 13C, 14A, 14B, 15, 16, 17, 18, and 19 are conceptual diagrams for explaining the control method illustrated in FIG. 12.

FIGS. 20, 21, and 22 are conceptual diagrams for explaining various control methods using a mobile terminal in accordance with an exemplary embodiment of the present disclosure.

MODES FOR CARRYING OUT THE PREFERRED EMBODIMENTS

Figure 2:
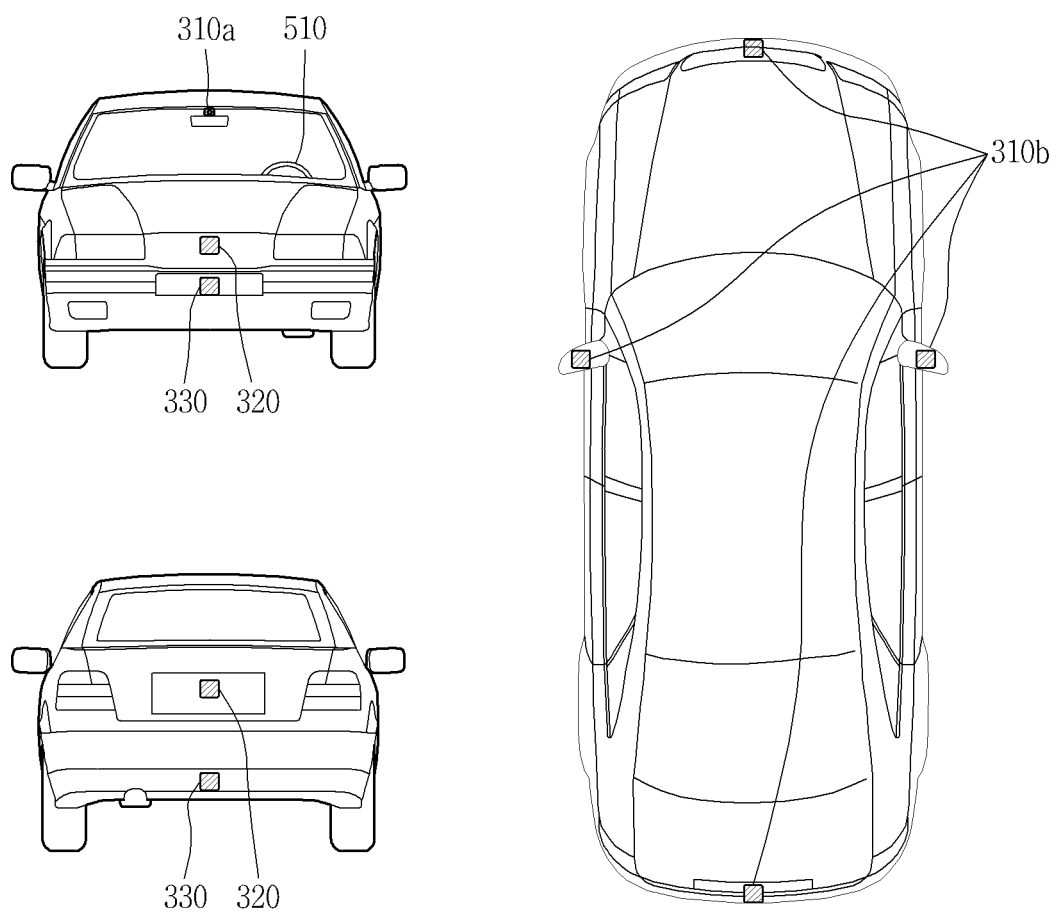
FIG. 2 is a view illustrating appearance of a vehicle at various angles in accordance with an embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present disclosure.

FIG. 2 is a view illustrating appearance of a vehicle at various angles in accordance with an embodiment of the present disclosure.

Figure 3:
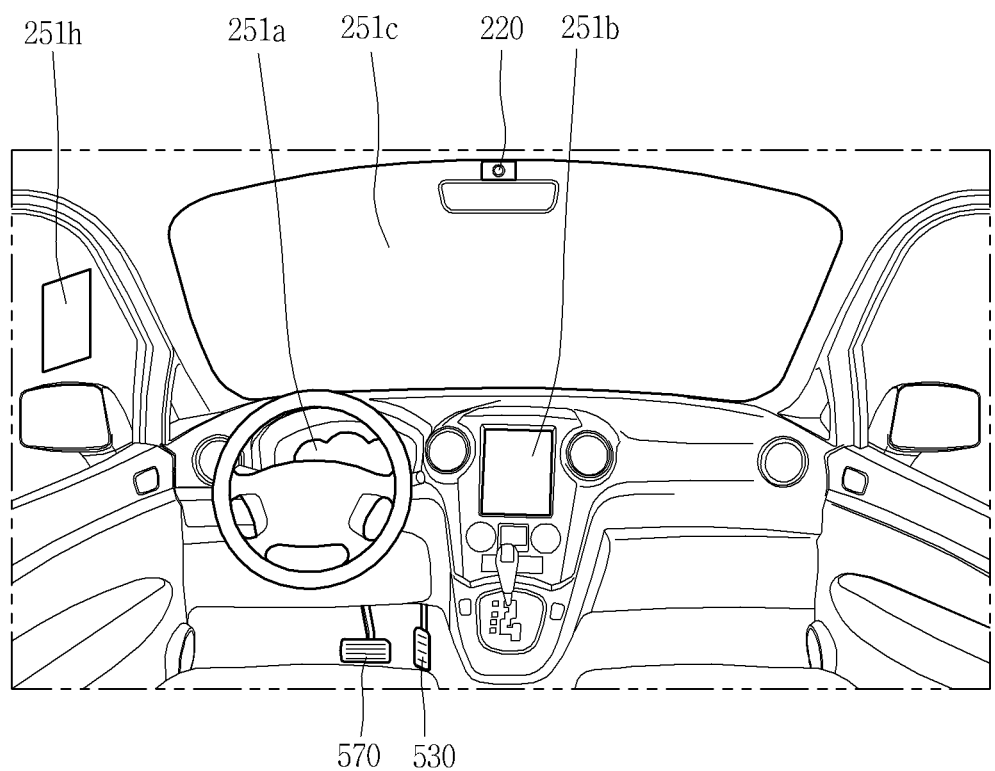
FIGS. 3 and 4 are views illustrating an inside of a vehicle in accordance with an embodiment of the present disclosure.
Figure 4:
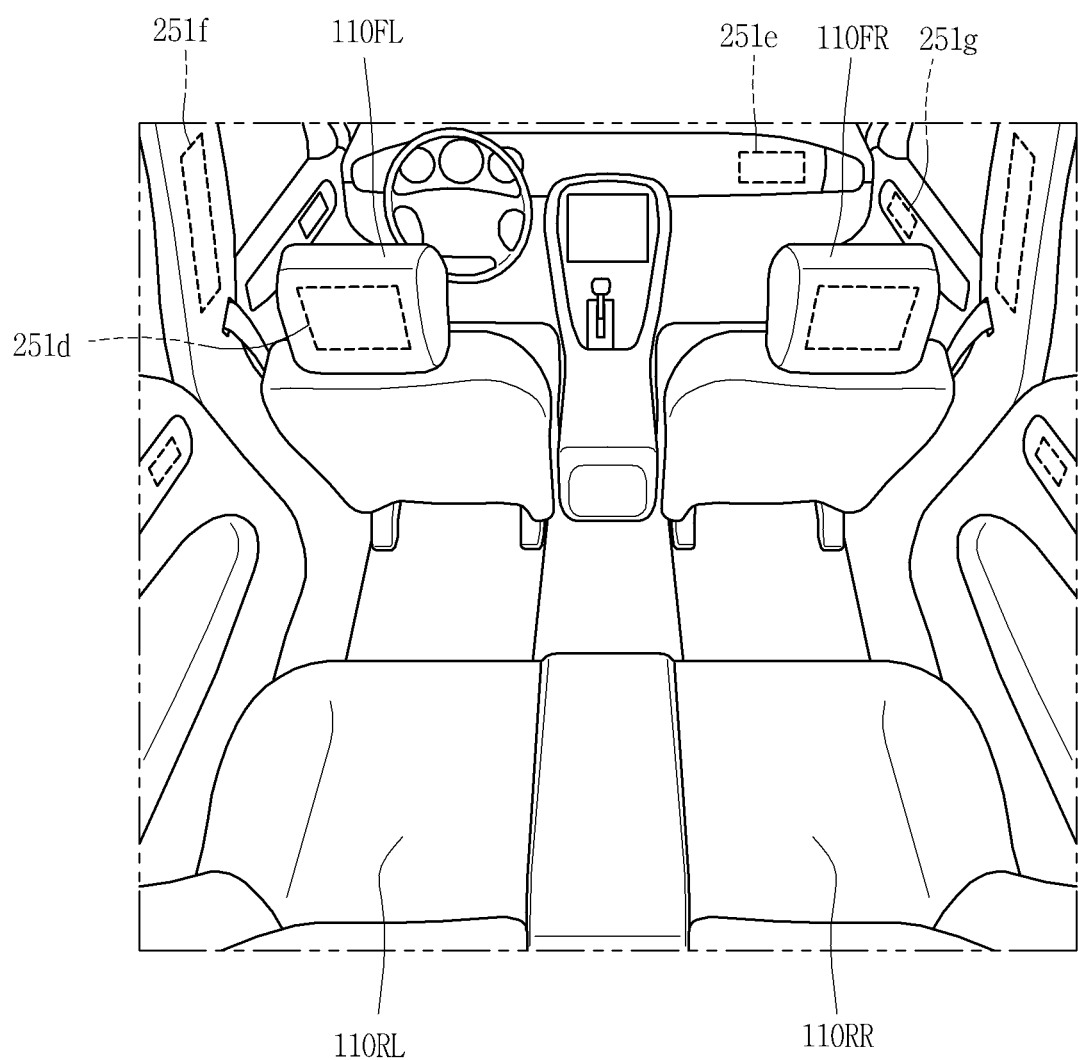

FIGS. 3 and 4 are views illustrating an inside of a vehicle in accordance with an embodiment of the present disclosure.

Figure 5:
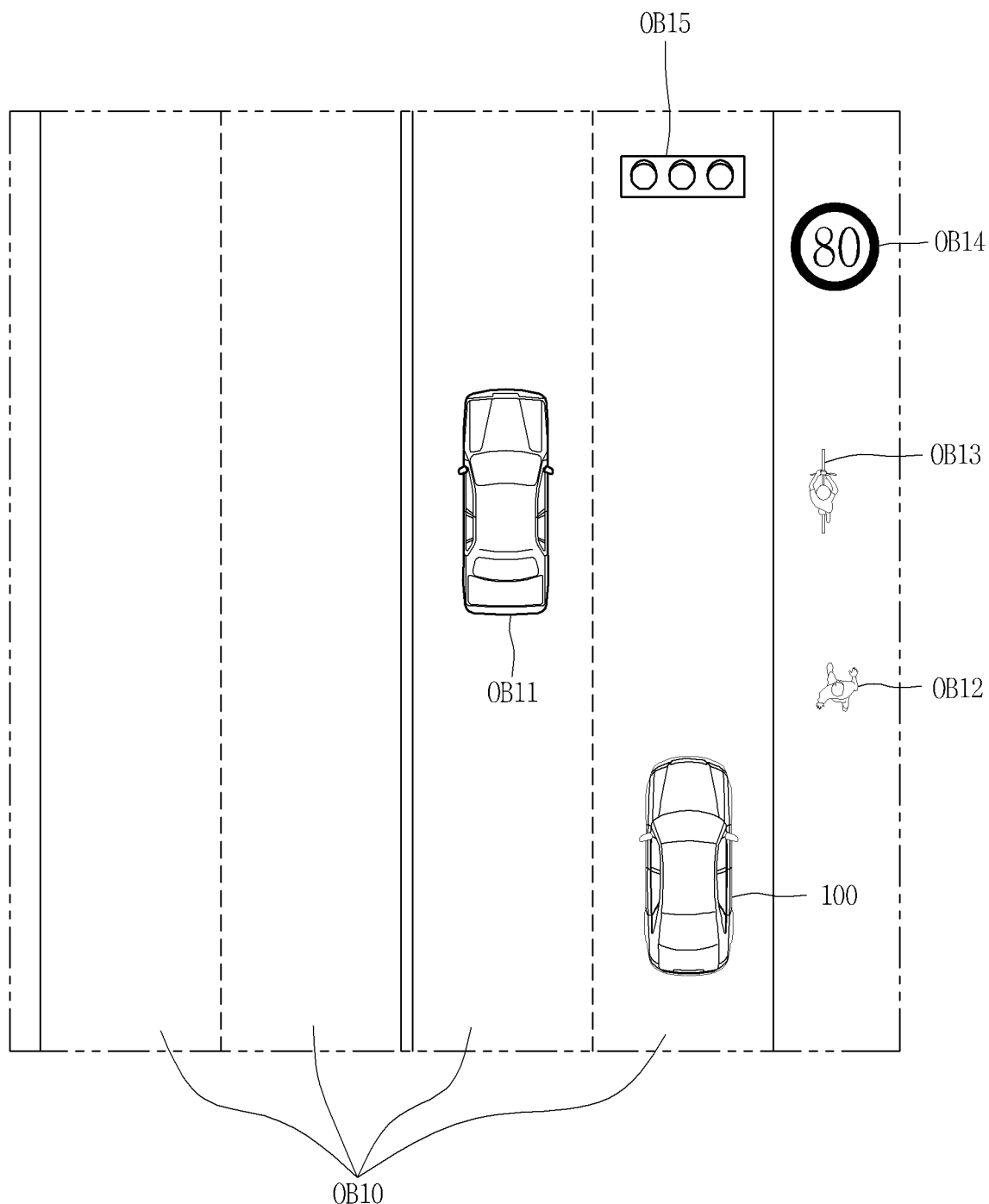
FIGS. 5 and 6 are reference views illustrating objects in accordance with an embodiment of the present disclosure.
Figure 6:
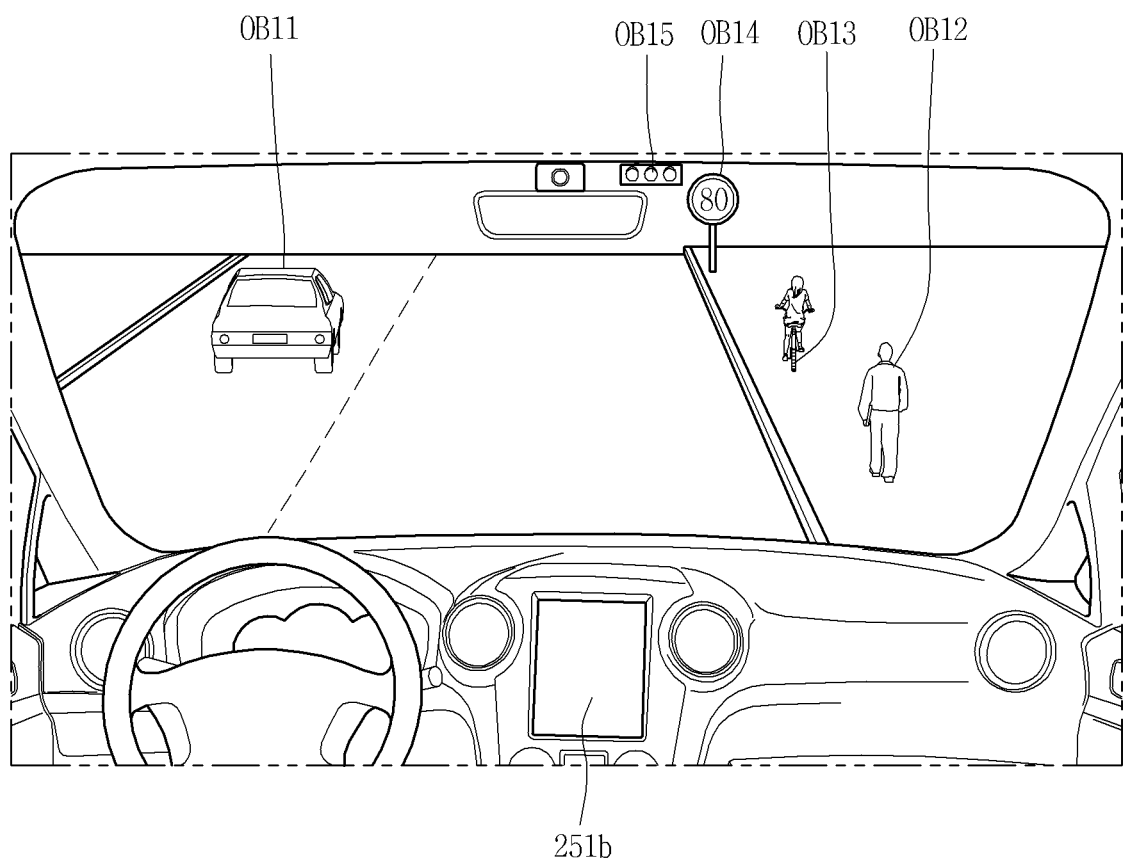

FIGS. 5 and 6 are reference views illustrating objects in accordance with an embodiment of the present disclosure.

Figure 7:
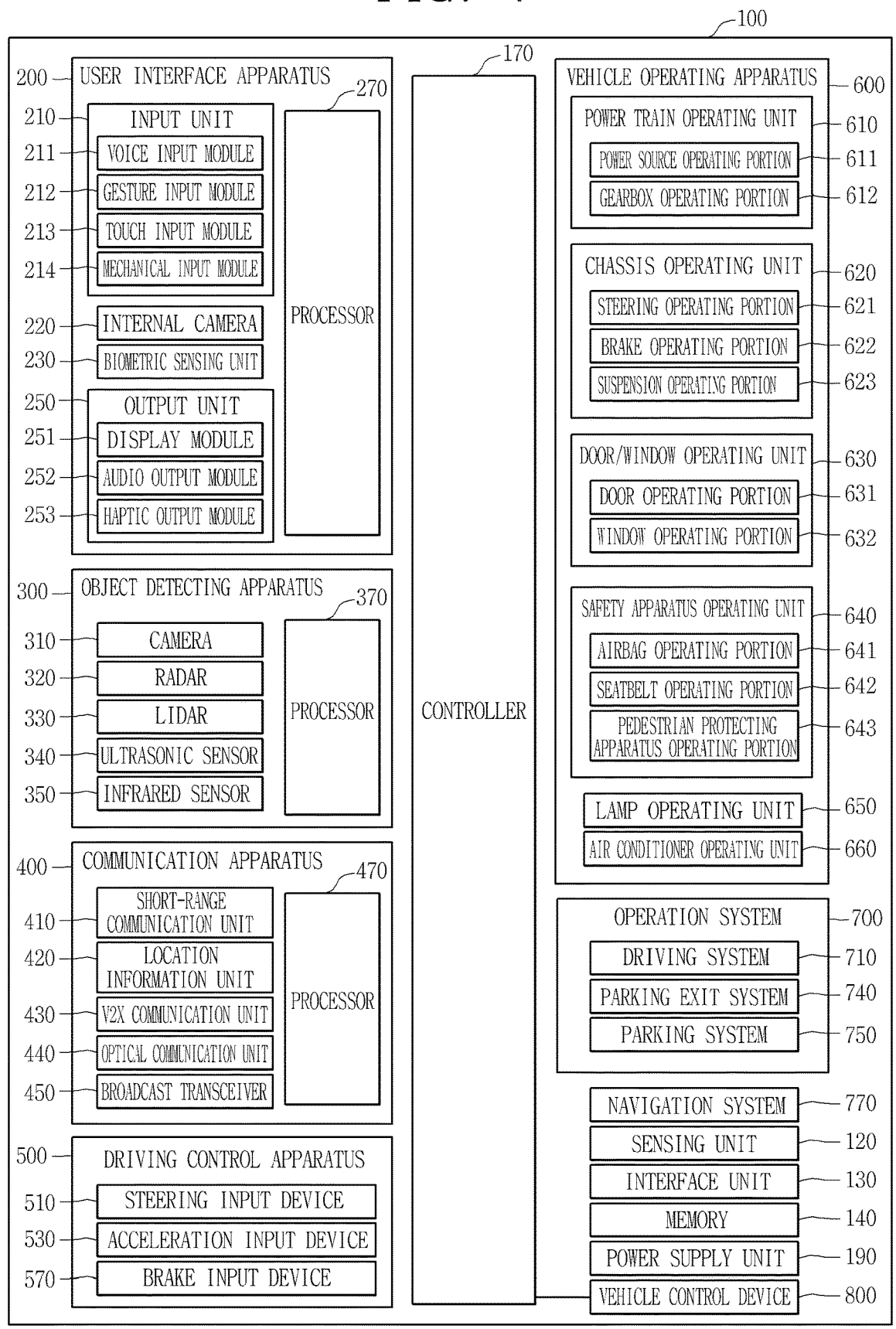
FIG. 7 is a block diagram illustrating a vehicle in accordance with an embodiment of the present disclosure.

FIG. 7 is a block diagram illustrating a vehicle in accordance with an embodiment of the present disclosure.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a vehicle control apparatus (or device) 800.

The vehicle control apparatus 800 may control at least one of those components illustrated in FIG. 7. From this perspective, the vehicle control apparatus 800 may be the controller 170.

Without a limit to this, the vehicle control apparatus 800 may be a separate device, independent of the controller 170. When the vehicle control apparatus 800 is implemented as a component independent of the controller 170, the vehicle control apparatus 800 may be provided on a part of the vehicle 100.

Hereinafter, description will be given of an example that the vehicle control apparatus 800 is a component separate from the controller 170 for the sake of explanation. In this specification, functions (operations) and control methods described in relation to the vehicle control apparatus 800 may be executed by the controller 170 of the vehicle. That is, every detail described in relation to the vehicle control apparatus 800 may be applied to the controller 170 in the same/like manner.

Also, the vehicle control apparatus 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, with reference to the accompanying drawings, a system according to one embodiment of the present disclosure will be described in more detail.

Figure 8:
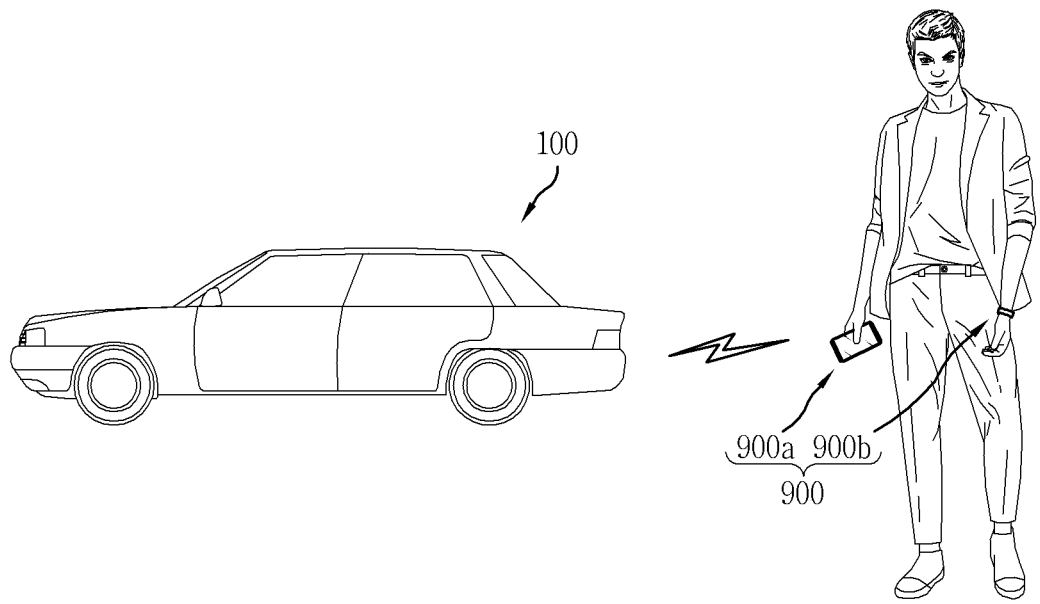
FIG. 8 is a conceptual diagram for explaining a system in accordance with the present disclosure.

FIG. 8 is a conceptual diagram for explaining a system in accordance with the present disclosure.

Referring to FIG. 8, a system in accordance with an exemplary embodiment of the present disclosure may comprise a vehicle 100 comprising a vehicle control apparatus 800 and a mobile terminal 900.

The mobile terminal 900 may include all types of terminals that can communicate, such as a bar-shaped mobile terminal 900a and a wearable mobile terminal 900b.

The vehicle 100 and mobile terminal 900 included in the system of the present disclosure may be wirelessly connected to enable wireless communication. For example, the vehicle 100 may perform wireless communication by being connected to a mobile terminal 900 present outside the vehicle 100 to enable wireless communication.

The mobile terminal 900 and vehicle 100 connected to enable wireless communication may wirelessly send and receive information (data, signals, control commands, etc.).

In an example, the inside of this vehicle 100 may be equipped with a seat where a user can sit. A plurality of seats may be provided, and they may come in various shapes. The seat may be formed in such a manner as to change at least one of its position, posture, and shape by control from the vehicle control apparatus 800.

The mobile terminal 900 may output at least one seat configuration on a display of the mobile terminal. Afterwards, once one of the at least one seat configuration is selected, the mobile terminal 900 may send to the vehicle 100 information including at least one of the position, posture, and shape of a seat corresponding to the selected seat configuration.

The vehicle 100 may operate the seat in the vehicle in such a manner that the position, posture, and shape of the seat match the received information.

The above-explained embodiment will be described in more concrete details with reference to FIGS. 12 to 22.

Figure 9:
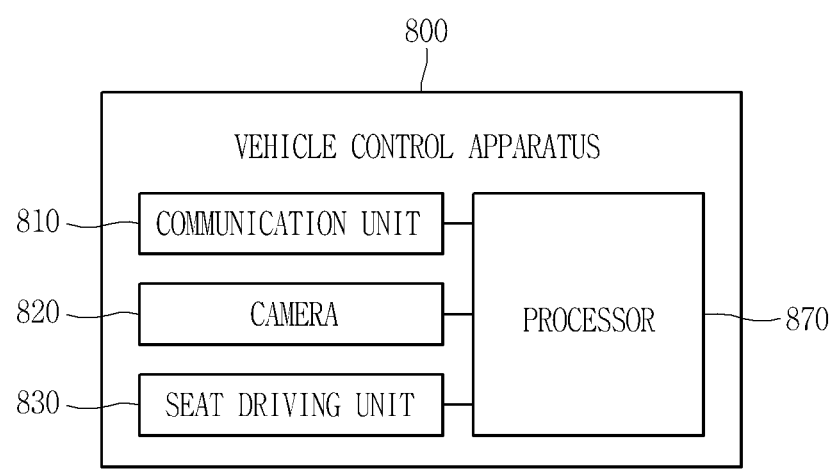
FIG. 9 is a conceptual diagram for explaining a vehicle control apparatus in accordance with an exemplary embodiment of the present disclosure.

FIG. 9 is a conceptual diagram for explaining a vehicle control apparatus in accordance with an exemplary embodiment of the present disclosure.

A vehicle control apparatus 800 related to the present disclosure may comprise a communication unit 810, a camera 820, a seat driving (or manipulating) unit 830, and a processor 870.

The communication unit 810 may be the above-explained communication apparatus 400. The communication unit 810 may be connected to communicate with the mobile terminal 900. Wireless communication with the mobile terminal may be performed if the mobile terminal's wireless communication unit is activated.

In an example, the vehicle control apparatus 800 (or vehicle 100) and a mobile terminal may be connected to enable wireless communication through the communication unit 810. The vehicle control apparatus 800 and a mobile terminal may be connected wirelessly to enable wireless communication with each other according to a request from the user, or, if there is a record showing that they have ever been connected before to enable wireless communication, may be connected wirelessly to enable communication with each other when the mobile terminal gets within a certain distance from the vehicle 100.

Also, the mobile terminal may send out a first signal for communicating and connecting with the vehicle at regular intervals, and, upon receiving a second signal from the vehicle 100 in response to the first signal, may be connected to communicate with the vehicle 100 (or vehicle control apparatus 800).

In another example, the communication unit 810 of the vehicle control apparatus 800 may send out a third signal for scanning the mobile terminal at regular intervals, and, upon receiving a fourth signal from the mobile terminal 900 in response to the third signal by the communication unit 810 of the vehicle control apparatus 800, may be connected to communicate with the mobile terminal 900.

The communication unit 810 may be provided within the vehicle (or vehicle control apparatus), or may take the form of a separate module and be provided in the vehicle as a separate component from the vehicle control apparatus. The communication unit 810 may be provided in such a manner as to communicate with (or electrically couple with) components of the vehicle.

The mobile terminal 900 connected to communicate with the vehicle 100 may comprise a communication unit, a display (touchscreen), a sensing unit, a camera, and a controller.

When the controller of the mobile terminal receives a user input while connected with wires or wirelessly to communicate with the vehicle control apparatus (or vehicle), it may transmit information related to the received user input to the vehicle control apparatus 800 (or vehicle) through the communication unit.

The information related to the user input may comprise information related to the type, time, position, etc. of the received user input.

For example, upon receive a touch on the touchscreen of the mobile terminal, the controller of the mobile terminal may transmit information related to the position, time, and type of the touch to the vehicle control apparatus (or vehicle) through the communication unit.

Also, the sensing unit of the mobile terminal may comprise at least one among a proximity sensor, an illumination sensor, a touch sensor, an acceleration sensor, a magnetic sensor, a gravity sensor (G-sensor), a gyroscope sensor, a motion sensor, an RGB sensor, an infrared sensor, a finger scan sensor, an ultrasonic sensor, an optical sensor (e.g., camera), a microphone, a battery gauge, an environmental sensor (e.g., a barometer, a hygrometer, a thermometer, a radiation sensor, a thermal sensor, a gas sensor), and a chemical sensor (e.g., an electronic nose, a healthcare sensor, a biometric sensor, etc.). Meanwhile, the mobile terminal disclosed in this specification may use information sensed by at least two of these sensors in combination.

The controller of the mobile terminal may transmit information related to a user input sensed by the sensing unit of the mobile terminal to the vehicle control apparatus (or vehicle) through the communication unit.

The processor 870 of the vehicle control apparatus 800 may determine (sense, extract, judge, or detect) a user input received by the mobile terminal, based on the information related to the user input received through the communication unit 810.

The controller of the mobile terminal may transmit an image received by the camera of the mobile terminal to the vehicle control apparatus 800 (or vehicle 100) through the communication unit. Also, the controller of the mobile terminal may analyze the image received by the camera of the mobile terminal by a preset method (algorithm), and transmit the analyzed information to the vehicle control apparatus 800. Here, the analyzed information may comprise information (e.g., volume, weight, shape, etc.) related to an object (user, load, etc.) that is about to board the vehicle 100.

Moreover, the vehicle control apparatus 800 of the present disclosure may comprise a camera 820. The camera 820 may comprise the above-explained internal camera 220 and the camera 310 included in the object detecting apparatus 300.

The internal camera 220 may be configured to capture the inside of the vehicle (also the inside of the trunk). Also, the camera 310 may be configured to capture the outside of the vehicle 100 so as to capture objects present outside the vehicle 100.

The processor 870 of the vehicle control apparatus 800 may determine information (e.g., volume, shape, etc.) related to an object(s) present outside the vehicle 100, based on images captured by the cameras 820.

The processor 870 of the vehicle control apparatus 800 may determine information (e.g., volume, shape, etc.) related to a space (specifically, a seating (loading) space) inside the vehicle 100, based on the images captured by the cameras 820.

The above camera 820 may be included in a sensing unit (not shown).

The sensing unit included in the vehicle control apparatus 800 related to the present disclosure may be the object detecting apparatus 300 explained with reference to FIG. 7 or the sensing unit 120 provided in the vehicle 100.

Also, the sensing unit may be a separate sensing unit from the object detecting apparatus 300 provided in the vehicle or the sensing unit 120 provided in the vehicle 100. Even if the sensing unit is a separate sensing unit, the sensing unit may have the characteristics of the sensing unit 120 or object detecting apparatus 300 explained with reference to FIG. 7.

Also, the sensing unit may be implemented by a combination of at least two among the camera 310, radar 320, LiDar 330, ultrasonic sensor 340, infrared sensor 350 included in the object detecting apparatus 300 and the sensing unit 120.

The sensing unit may sense information related to the vehicle 100 of the present disclosure.

The information related to the vehicle may be at least one of vehicle information (or driving state of the vehicle) and surrounding information of the vehicle.

For example, the vehicle information may include the driving speed of the vehicle, the weight of the vehicle, the number of passengers in the vehicle, the braking force of the vehicle, the maximum braking force of the vehicle, a driving mode of the vehicle (autonomous driving mode or manual driving mode), a parking mode of the vehicle (autonomous parking mode, automatic parking mode, manual parking mode), whether or not a user is on board the vehicle, and information associated with the user (for example, whether or not the user is an authenticated user), and the like.

The surrounding information of the vehicle may be a state of road surface (frictional force) on which the vehicle is traveling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, a description will be given with respect to an example in which a separate sensing unit is provided in the vehicle control apparatus 800 for convenience of explanation. If the processor 870 acquires certain information through a sensing unit, this may be understood that the processor 870 acquires certain information by using at least one between the object detecting apparatus 300 and the sensing unit 120 provided in the vehicle 100.

Meanwhile, the vehicle control apparatus 800 related to the present disclosure may comprise a seat driving unit 830. The seat driving unit 830 may be included in the vehicle control apparatus 800, or may be separated from the vehicle control apparatus 800 and provided in the vehicle in the form of a separate module.

The seat driving unit 830 may be configured to manipulate a seat provided inside the vehicle 100. The seat driving unit 830 may be provided for each of a plurality of seats provided inside the vehicle 100. The seat (vehicle seat) provided in the vehicle may be a component that is provided in the vehicle so that a passenger can sit in. Also, the seat driving unit 830 may be configured to tilt a portion of the seat touched by the user's hips or legs or move it forward, backward, left, right, upward, or downward.

The seat driving unit 830 may be configured to move a seat in the vehicle forward or backward or upward or downward. Also, the seat driving unit 830 may manipulate the seat in such a way that the backrest of the vehicle's seat is tilted or the seat is folded or unfolded.

That is, the seat driving unit 830 may manipulate a seat in the vehicle in such a way as to change at least one among the position of a seat in the vehicle (by moving the seat forward, backward, upward, or downward), the posture of the seat (by tilting the backrest of the seat or folding or unfolding it), and the shape of the seat.

Such manipulation of the seat driving unit 830 may mean physically controlling the seat, based on an electrical control signal received from the processor 870.

The vehicle control apparatus 800 of the present disclosure may comprise a processor 870 capable of controlling the communication unit 810, camera 820, seat driving unit 830, etc.

The processor 870 may be the controller 170 explained with reference to FIG. 7.

The processor 870 may control the components explained with reference to FIG. 7 and the components explained with reference to FIG. 8.

The processor 870 included in the vehicle control apparatus 800 related to the present disclosure may capture an object approaching the vehicle by using the camera 820.

Afterwards, the processor 870 may sense information related to the object on the basis of an image captured by the camera 820 and control the seat driving unit 830 such that the seat is placed in a preset position on the basis of the sensed information related to the object.

Hereinafter, a method for placing a vehicle seat in an optimal position in accordance with the present disclosure will be described in more details with reference to the accompanying drawings.

Figure 10:
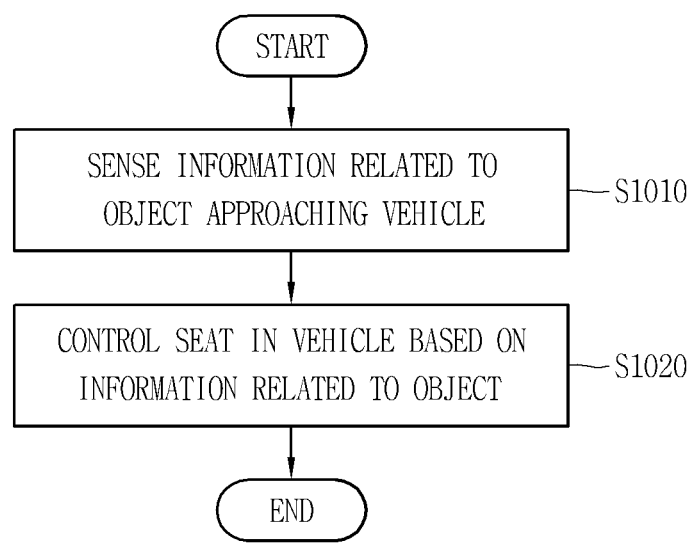
FIG. 10 is a flowchart for explaining a representative control method in accordance with the present disclosure.

FIG. 10 is a flowchart for explaining a representative control method in accordance with the present disclosure. FIG. 11 is a conceptual diagram for explaining the control method illustrated in FIG. 10.

First of all, referring to FIG. 10, the vehicle control apparatus 800 in accordance with the present disclosure may capture an object approaching the vehicle 100 by using the camera 820. In an example, the processor 870 may sense an object approaching an area present within a certain distance from the vehicle 100 by using a sensing unit (e.g., radar, LiDar, ultrasonic sensor, camera, etc.). Here, the certain distance may be determined by the type of the sensing unit, determined by the performance of the sensing unit, or determined or varied according to the user's settings.

Afterwards, the processor 870 may activate the camera 820 when an object enters an area present within the certain distance. Here, the camera to be activated may be at least one between the internal camera 220 or the camera 310 configured to capture the outside.

Also, the camera 820 may be provided on at least one of the front, rear, left, and right of the vehicle. The camera 820 provided on at least one of the front, rear, left, and right of the vehicle may be a camera used for the AVM (Around View Monitor) feature.

In an example, upon sensing an object approaching the vehicle 100 through a sensing unit, the processor 870 may activate the camera 820 provided on at least one of the front, rear, left, and right of the vehicle, based on the direction the object is approaching. The activated camera 820 may capture images.

Afterwards, the processor 870 may capture an object approaching the vehicle 100 by using the camera 820. Here, the object approaching the vehicle 100 may refer to an object that has entered an area present within the certain distance and is approaching the vehicle 100.

Afterwards, in the present disclosure, information related to the object approaching the vehicle may be sensed (S1010).

For example, as shown in (a) of FIG. 11, upon sensing objects 1100a, 1100b, 1100c, and 1110 approaching the vehicle 100 in an area within a certain distance from this vehicle 100, the objects 1100a, 1100b, 1100c, and 1110 may be captured using the camera 820.

Thereafter, the processor 870 may sense (determine, extract, judge, and detect) information related to the objects 1100a, 1100b, 1100c, and 1110 on the basis of an image captured by the camera 820.

Here, the information related to the objects may comprise information such as the number of objects, the types of the objects (for example, whether they are a person or load), the volumes of the objects, and the shapes of the objects. Also, the information related to the objects may comprise information about personal details, such as whether the objects are a driver of this vehicle 100, a family, or an acquaintance.

For example, the memory 140 of the vehicle may store the user's facial images and the user's personal details/information in association with each other. The processor 870 may extract a face portion from an image captured by the camera and extract information about personal details of an object(s) approaching the vehicle by comparing the facial images and personal details/information stored in the memory 140 to each other.

Afterwards, a seat in the vehicle is controlled based on the information related to the object (S1020).

Specifically, the processor 870 may control the seat driving unit 830 such that the seat provided in the vehicle is placed in a preset position on the basis of the information related to the object.

The preset position (or posture or shape) may be determined based on information related to object(s). For example, the preset position (or posture or shape) may be determined based on the types of the objects, the number of objects, personal details of the objects, etc.

For example, if there are n objects, the preset position may be a position where a first configuration is formed, and if there are m objects different from n, the preset position may be a position where a second configuration different from the first configuration is formed.

That is, in this specification, placing the seat in a preset position should be understood as comprising placing the seat in a preset posture or setting up the seat in a preset shape.

Referring to (b) of FIG. 11, the seat driving unit 830 may control (manipulate) a plurality of seats 840, 840a, 840b, 840c, and 840d provided in the vehicle 100.

For example, the seat driving unit 830 may manipulate a seat 840 in such a way as to move the seat 840 provided in the seat forward or backward (1120b), move the seat 840 upward or downward (1120c), tilt the backrest of the seat (1120a), or fold or unfold the seat 840.

In other words, the seat driving unit 830 may be configured to change at least one among the position of the seat, the posture of the seat, and the shape of the seat.

Also, the vehicle 100 of the present disclosure may comprise a trunk 850, and the seat driving unit 830 may be configured to vary the loading space of the trunk 850.

As explained above, the information related to object(s) may comprise at least one among the number of objects approaching the vehicle 100, the types of the objects, and the volumes of the objects.

The processor 870 may control the seat driving unit 830 in such a way as to change at least one among the position of the seat 840, the posture of the seat 840, and the shape of the seat 840 based on the information related to the object(s).

As shown in (b) of FIG. 11, the seats 840 provided in the vehicle may comprise a plurality of seats 840a, 840b, 840c, and 840d.

The processor 870 may determine at least one among the position, posture, and shape of each of the plurality of seats, based on the information related to the object(s). The seat driving unit 830 may manipulate the plurality of seats 840a,

840b, 840c, and 840d provided in the vehicle so as to correspond to at least one among the determined position, posture, and shape.

Figure 14A:
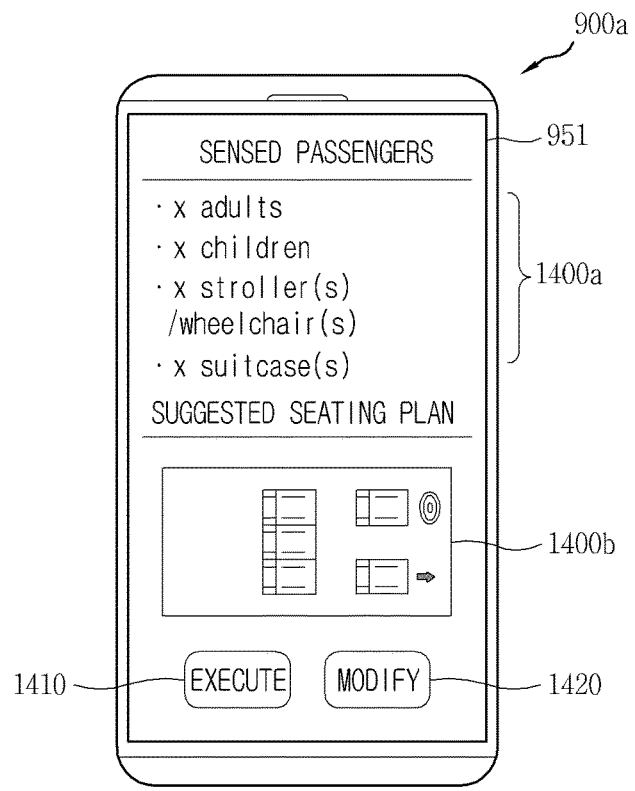
Figure 14B:
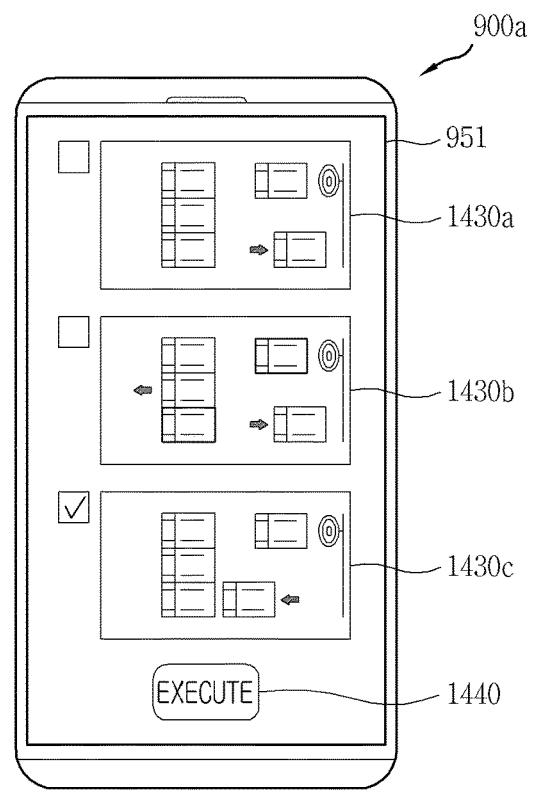

For example, as shown in FIG. 14B, if there are three objects approaching the vehicle 100 and the objects are people, the processor 870 may control the seat driving unit 820 to move one 840b of the plurality of seats forward (1430a). In this case, a seat configuration may be formed in which three people can sit comfortably in the vehicle.

In another example, if there are two objects approaching the vehicle 100 and the objects are people, the processor 870 may determine the objects' personal details on the basis of an image captured by the camera 820.

For example, if the two people are in an equal relationship (e.g., husband and wife), the processor 870 may move one 840b of the plurality of seats backward (1430c). In this case, the two people can sit comfortably in the front seats 840a and 840b.

In another example, if the two people are in an employer-employee relationship (e.g., boss and chauffer), the processor 870 may move one 840b of the plurality of seats forward (1430b). In this case, the boss, among the two people, can sit comfortably in the back seat 840d.

With this configuration, the present disclosure may provide a vehicle control apparatus and a vehicle which are capable of placing the vehicle's seat in an optimal position depending on the object approaching the vehicle.

The processor 870 may switch on a lamp on the vehicle 100 in a preset manner while the seat is being manipulated (i.e., while the seat is being moved).

Figure 15:
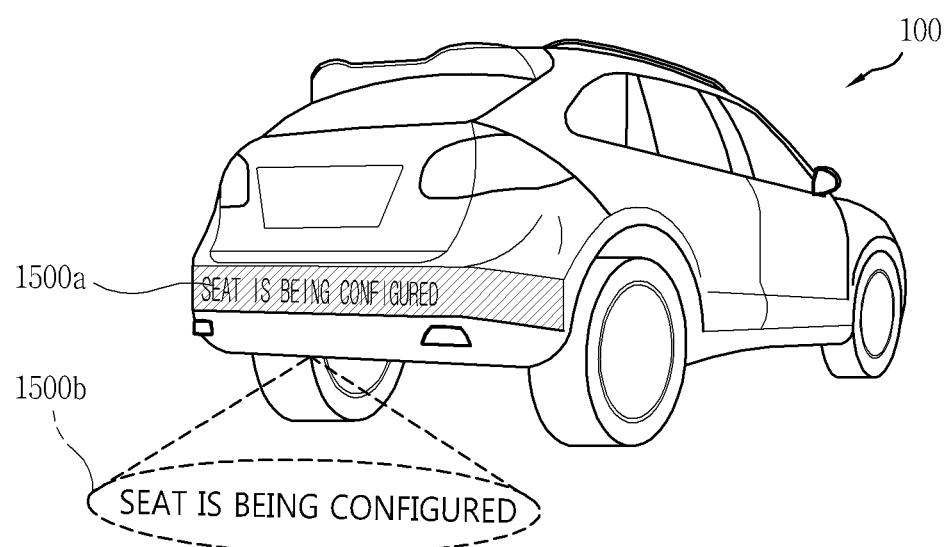

Referring to FIG. 15, the lamp on the vehicle 100 may be configured to display certain information (e.g., text, image, video, etc.). If the seat is being manipulated, the processor 870 may display information 1500a on the lamp to indicate that the seat is being configured.

In another example, the lamp on the vehicle 100 may output light to display certain information on a road surface. If the seat is being manipulated, the processor 870 may control the lamp to display information 1500b on the road surface to indicate that the seat is being configured.

Also, there may be cases where the seat cannot be manipulated due to an object (load) loaded in the vehicle. That is, there may be cases where the seat cannot be placed in a preset position due to an object loaded in the vehicle.

Figure 18:
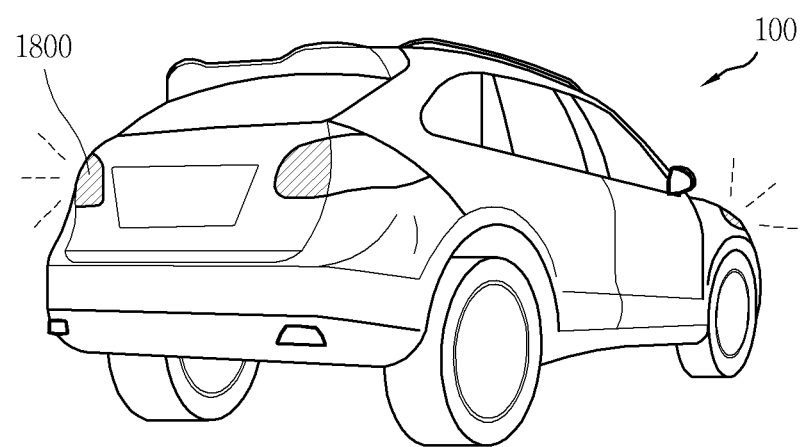

Upon sensing by the sensing unit that the seat cannot be placed in a preset position, the processor 870 may switch on the lamp 1800 provided on the vehicle in a preset pattern, as shown in FIG. 18. For example, the processor 870 may switch on an emergency lamp provided on the vehicle at regular intervals.

With this configuration, the present disclosure may provide a vehicle control method that indicates effectively that a seat is being manipulated, before the user boards the vehicle, and, at the same time, informs the user that the seat cannot be manipulated, before the user boards the vehicle.

Meanwhile, the present disclosure may provide a user interface that allows a vehicle's seat to be placed in an optimal position via communication with a mobile terminal 900. Now, a method of changing at least one among the position of the seat, the posture of the seat, and the shape of the seat by using a mobile terminal will be described in more concrete details with reference to the accompanying drawings.

FIG. 12 is a flowchart for explaining a control method for changing the position of a seat by using a mobile terminal in accordance with an exemplary embodiment of the present disclosure. FIGS. 13A, 13B, 13C, 14A, 14B, 15, 16, 17, 18, and 19 are conceptual diagrams for explaining the control method illustrated in FIG. 12.

Referring to FIG. 12, in the present disclosure, an object that is about to board a vehicle is sensed (S1202). Here, the object that is about to board the vehicle may refer to an object that is about to get seated or loaded in the vehicle.

As explained above, the object that is about to board the vehicle may comprise an object approaching the vehicle 100 or an object that has entered an area within a certain distance from the vehicle 100.

In the present disclosure, an object that is about to board the vehicle may be sensed (determined) in various ways. In an example, as explained previously, the processor 870 may sense an object approaching the vehicle by using the camera 820 included in the vehicle control apparatus 800 and determine the sensed object as an object that is about to board the vehicle.

In another example, in the present disclosure, an object that is about to board the vehicle may be sensed by using a mobile terminal, a smart home (IoT (Internet of Things), etc.

For example, as shown in FIG. 13A, in the present disclosure, an object that is about to board the vehicle may be sensed by using a mobile terminal (for example, wearable terminal 900b).

The mobile terminal 900b may be fitted to the user's body and communicate with the vehicle 100 (or vehicle control apparatus 800).

Also, the mobile terminal 900b may comprise a sensing unit, and determine the type of an object (load) the user wants to load by the sensing unit. Here, the sensing unit may comprise at least one among a proximity sensor, an illumination sensor, a touch sensor, an acceleration sensor, a magnetic sensor, a gravity sensor (G-sensor), a gyroscope sensor, a motion sensor, an RGB sensor, an infrared sensor, a finger scan sensor, an ultrasonic sensor, an optical sensor (e.g., camera), a microphone, a battery gauge, an environmental sensor (e.g., a barometer, a hygrometer, a thermometer, a radiation sensor, a thermal sensor, a gas sensor), and a chemical sensor (e.g., an electronic nose, a healthcare sensor, a biometric sensor, etc.). Meanwhile, the mobile terminal disclosed in this specification may use information sensed by at least two of these sensors in combination.

The mobile terminal 900b may sense the position of the user's arm (or wrist) and the muscle state and movement of the user and determine the type of a load based on this information.

For example, as shown in (a) of FIG. 13A, upon sensing by the sensing unit of the mobile terminal 900b that the arm (or wrist) is at the lower back of the body and the arm is stationary (or moves slower than a certain pace/less than a certain distance), the mobile terminal may determine that the load the user is carrying is a suitcase.

In another example, as shown in (b) of FIG. 13A, upon sensing by the sensing unit of the mobile terminal 900b that the arm (or wrist) is at the front of the body, the palm is facing upward, and the arm is stationary, the mobile terminal may determine that the load the user is carrying is box-shaped.

In another example, as shown in (c) of FIG. 13A, upon sensing by the sensing unit of the mobile terminal 900b that the arm (or wrist) is at the front of the body, the palm is facing downward, and the arm is stationary, the mobile terminal may determine that the load the user is carrying is a stroller (or cart).

Moreover, the mobile terminal 900b may measure the weight of the load the user is carrying by the sensing unit, based on the muscle state of the arm (for example, the amount of force applied to the arm muscles).

In this way, the present disclosure allows for determining the type and weight of an object (load) the user is carrying by using a mobile terminal. Also, it is possible to receive images using the camera provided in the mobile terminal 900b and sense the volume and type of an object based on the received images.

Figure 13B:
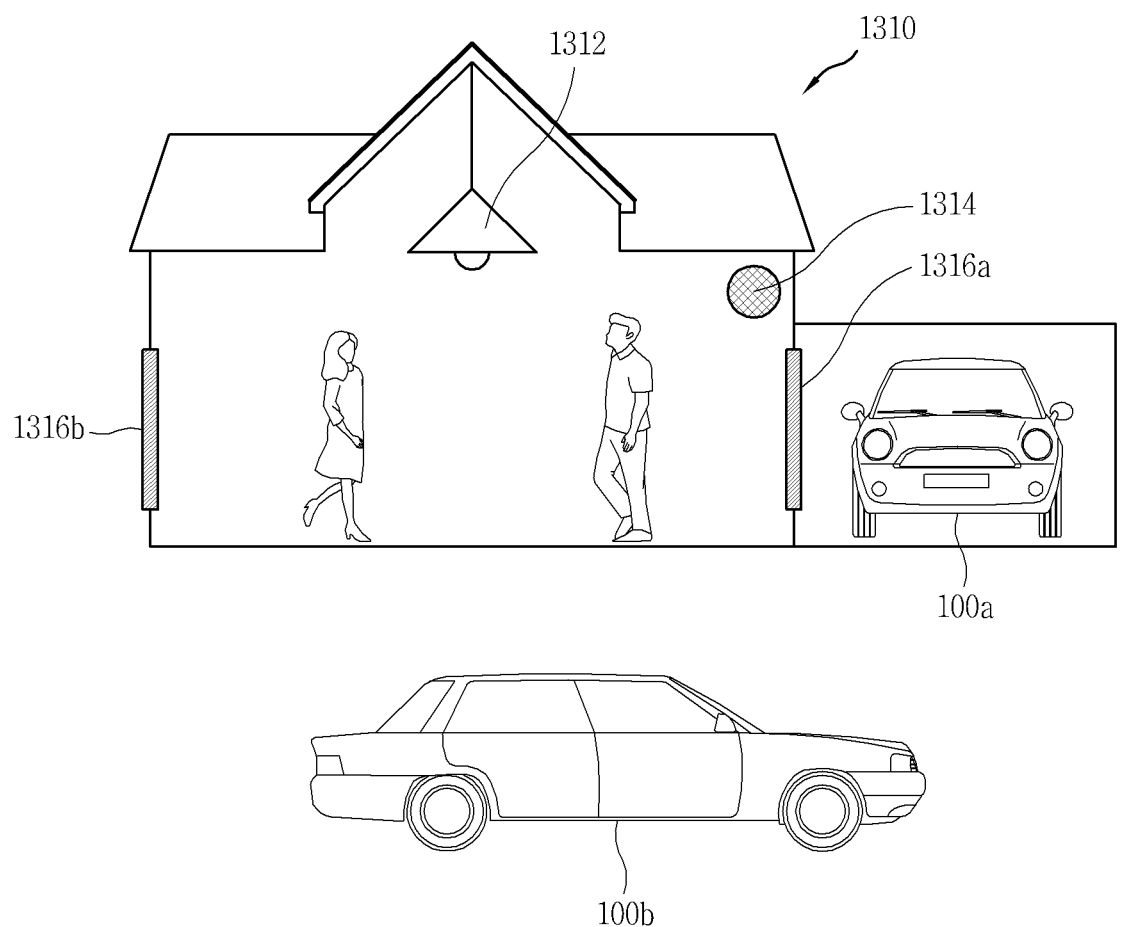

In another example, as shown in FIG. 13B, the vehicle control apparatus 800 (or vehicle 100) of the present disclosure may perform communication with an IoT system 1300 provided in a smart home. The smart home may be equipped with an IoT system, and the IoT system may comprise a communication unit, a camera 1313, a microphone 1314, and sensors 1316a and 1316b installed on doors.

Upon receiving a preset speech (e.g., "Time to go", "Hurry up", etc.) through the microphone, the IoT system 1300 may determine that an object (user) in the smart home will leave the smart home.

If the preset speech is recognized by the microphone 1314 or a preset condition is met (for example, equipment provided in the smart home are turned off), the IoT system 1300 may activate the camera 1312 and sense the number of objects leaving the smart home and their types and volumes, on the basis of an image received by the camera 1312.

Moreover, when the door opens, the IoT system 1300 may sense the number of objects leaving the smart home and their types and volumes by the sensors 1316a and 1316b or camera 1312 provided on the doors.

Furthermore, the IoT system may communicate with a smart key for controlling the vehicle, and, upon sensing a movement of the smart key, determine that an object leaving the smart home will use the vehicle.

In addition, if there are a plurality of vehicles 100a and 100b, the IoT system may determine which vehicle to use by using the sensors 1316a and 1316b provided on the doors.

For example, when a door to a garage opens, the IoT system may be connected to a vehicle 100a present in the garage to communicate with it, and information (the number, types, and volumes of objects) related to a sensed object(s) may be transmitted to the vehicle 100a.

In another example, when a door to the outside opens, the IoT system may be connected to a vehicle 100a present in the outside to communicate with it, and information (the number, types, and volumes of objects) related to a sensed object(s) may be transmitted to the vehicle 100a.

Also, the IoT system may determine information related to an object(s) that is about to board the vehicle based on preset schedule information and transmit the determined information related to the object(s) to the vehicle (or vehicle control apparatus).

Moreover, as explained previously, in the present disclosure, objects that are about to board the vehicle may be sensed by using a camera provided in the vehicle. For example, upon receiving information related to an object from the mobile terminal 900b or IoT system 1300 or sensing an object approaching the vehicle (or an object entering an area within a certain distance from the vehicle) through a sensing unit in the vehicle, the vehicle control apparatus 800 may activate the camera 820.

As shown in (a) of FIG. 13C, the camera 820 may be a camera 820a (310 in the foregoing description) configured to capture the outside of the vehicle.

The processor 870 may sense information related to objects 1100a, 1100b, and 1100 that are about to board the vehicle 100, on the basis of an image captured by the camera 820a.

Meanwhile, upon sensing an object, the processor 870 may send out a signal for determining whether the sensed object is about to board the vehicle or not. The signal may be transmitted to the mobile terminal 900a or vehicle 100's smart key 1330 the object 1100a is carrying.

The mobile terminal 900a or smart key 1330 may be an authenticated device. Here, the authenticated device may refer to a device that has ever communicated with the vehicle 100 or a device that has successfully completed an authentication procedure in advance to perform communication.

Upon receiving a response signal to the sent signal, the processor 870 may determine an object captured by the camera 820a as an object that is about to board the vehicle 100, and sense information related to the object.

On the contrary, if there is no response signal to the sent signal, the processor 870 may not determine that an object 1320 is about to board the vehicle 100 even if the object 1320 is captured by the camera 820a. That is, the object 1320 may be classified as an object that is not about to board the vehicle.

Also, as shown in (b) of FIG. 13C, once an object is deemed to be about to board the vehicle 100, the processor 870 may determine the object's personal details by using the object's facial portion 1330 in an image captured by the camera 820a, or determine the type, shape, volume, etc. of an object 1340 deemed as a material object.

Referring back to FIG. 12, in the present disclosure, information related to a sensed object is confirmed afterwards (S1204).

Upon sensing information related to an object approaching the vehicle by a camera on the mobile terminal, IoT system, or vehicle, the processor 870 may transmit the information related to the object to the mobile terminal 900a through the communication unit 810, in order to confirm the information related to the sensed object.

That is, when the object approaches, the communication unit 810 may be configured to communicate with the mobile terminal 900a, and may be connected to communicate with the mobile terminal 900a.

When an object approaches the vehicle, the processor 870 may transmit information related to the sensed object to the mobile terminal 900a through the communication unit 810. In this case, as shown in FIG. 14A, the information 1400a related to the object and at least one seating plan 1400b corresponding to the information related to the object may be outputted to a display 951 of the mobile terminal 900a.

The information 1400a related to the object and the seating plan 1400b which are outputted to the display 951 of the mobile terminal 900a may be sequentially outputted according to an input from the user.

For example, upon receiving information related to an object from the vehicle control apparatus 800, the display 951 of the mobile terminal may output only the information 1400a related to the object. Afterwards, if a preset type of touch (e.g., a short touch, long touch, double touch, multi-touch, drag, flick, etc.) is applied to where the information 1400a related to the object is outputted, the controller of the mobile terminal 900a may transmit a signal for confirming the information related to the object approaching the vehicle to the vehicle control apparatus 800 through the communication unit.

When the preset type of touch is applied, the seating plan 1400*b* may be outputted to the display 951 of the mobile terminal 900*a*.

The controller of the mobile terminal 900*a* may output at least one seating plan 1400*b* to the display 951. Although FIG. 14A illustrates that one seating plan 1400*b* is being outputted, the present disclosure is not limited to this and a plurality of seating plans may be outputted.

The seating plan may be determined based on information related to an object(s) that is about to board the vehicle (the number, types, and volumes of objects), and the controller of the mobile terminal may select and output one seating plan corresponding to the information related to the object(s) from among the plurality of seating plans, based on information related to the confirmed object(s).

A seating plan may be associated with the type of information related to an object(s) (e.g., the number, types, etc. of objects), and the controller (or processor 870) of the mobile terminal may select one seating plan based on the type of information related to the sensed object(s).

Afterwards, information related to the sensed (confirmed) object(s) and the current status of the vehicle 100 are compared (S1206).

Figure 17:
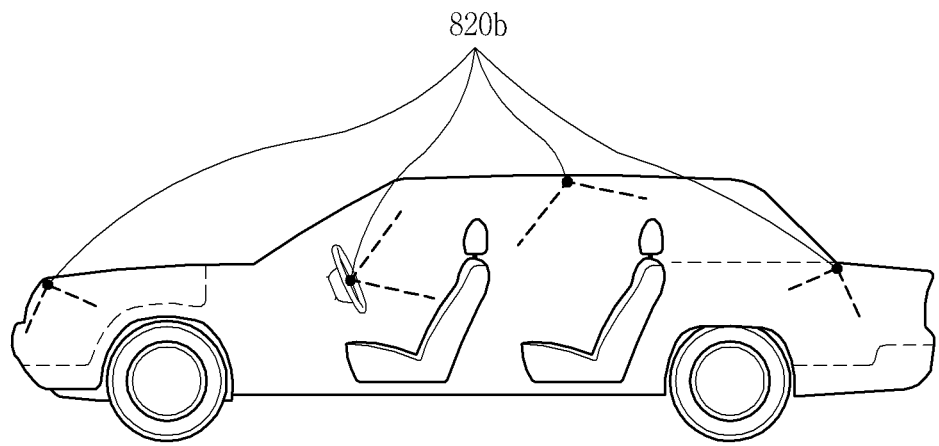

Upon receiving a signal for confirming the information related to the object(s) from the mobile terminal 900*a*, cameras 820*b* (220 in the foregoing description) provided inside the vehicle may be activated. As shown in FIG. 17, the cameras 820*b* may be configured to capture the inside of the vehicle 100.

The processor 870 may determine the conditions (the seat positions, the presence or absence of loaded objects, the volume of a loading space, etc.) of the inside (the vehicle's seating portion, seats, and trunk) of the vehicle, on the basis of images received by the cameras 820*b*.

Afterwards, in the present disclosure, it is possible to determine if there is enough space for an object approaching the vehicle to get seated (loaded) in the vehicle 100 (S1208). For example, the processor 870 may determine whether the object can be seated (loaded) in the vehicle or not, based on the type and volume of the object approaching the vehicle and the condition of the inside of the vehicle.

Specifically, the vehicle 100 in accordance with the present disclosure may comprise internal cameras 820*b* configured to capture the inside of the vehicle 100, as shown in FIG. 17. The processor 870 may sense a loading space inside the vehicle on the basis of images captured by the internal cameras 820*b*.

Also, the processor 870 may control the seat driving unit 830 such that a seat 840 provided in the vehicle is placed in a preset position based on information (the number, types, and volumes of objects) related to the loading space and the object.

Specifically, if it is determined that an object approaching the vehicle 100 cannot be loaded in its entirety, based on the information related to the object(s) and the loading space, the processor 870 may transmit alert information including a determination result to the mobile terminal 900*a* through the communication unit 810.

Here, the processor 870 may sense an object with variable volume from an image captured by the camera 820*a* configured to capture the outside of the vehicle. Here, the object with variable volume may refer to a type of object that stored in the memory 140, such as a stroller, cart, suitcase, carrier, etc. Also, the memory 140 may store information about the minimum volume of each type of object with variable volume.

If an object with variable volume is included in an image captured by the camera 820*a*, the processor 870 may determine whether the object can be loaded in its entirety or not, based on the minimum volume of the object.

If the processor 870 determines that the object cannot be seated (loaded) in its entirety, the processor 870 of the vehicle control apparatus 800 in accordance with the present disclosure may transmit alert information to a preset terminal (e.g., the terminal 900*a* performing communication or an authenticated terminal) to indicate that the object cannot be seated (loaded) (S1210). In this case, the alert information, instead of the seating plan 1400*b*, may be outputted to the display 951 of the mobile terminal 900*a*.

Meanwhile, if the processor 870 determines that the object can be seated (loaded) in its entirety, the present disclosure proceeds to the step of recommending to reconfigure the seat 840 (or trunk) provided in the vehicle (S1212).

Specifically, if the processor 870 determines that the object can be seated (loaded) in its entirety, the processor 870 may transmit a signal to the mobile terminal 900*a* to indicate that the object can be seated (loaded).

Upon receiving the signal, the mobile terminal 900*a* may output a seating plan 1400*b* corresponding to information related to the object to the display 951. The present disclosure is not limited to this, and the processor 870 of the vehicle control apparatus 800 may select a seating plan corresponding to the information related to a sensed object and transmit the selected seating plan to the mobile terminal 900*a*.

In this case, as shown in FIG. 14A, the information 1400*a* related to the object and the seating plan 1400*b* may be outputted to the display 951 of the mobile terminal 900*a*.

Meanwhile, as shown in FIG. 14A, an execute button 1410 for placing a seat in the vehicle in a position corresponding to the seating plan 1400*b* and a button 1420 for changing the seating plan may be displayed on the display 951 of the mobile terminal.

Specifically, a graphics object 1420 (button for modifying the seating plan) associated with a function for outputting a plurality of different seating plans may be outputted to the display 951 of the mobile terminal 900*a*.

When the graphics object 1420 is selected, the controller of the mobile terminal 900*a* may output a plurality of seating plans 1430*a*, 1430*b*, and 1430*c* to the display 951, as shown in FIG. 14B. That is, when the graphics object 1420 is selected, a plurality of seating plans 1430*a*, 1430*b*, and 1430*c* may be outputted to the display 951 of the mobile terminal.

The user may select one of the outputted seating plans 1430*a*, 1430*b*, and 1430*c*. When one of the seating plans is selected, the controller of the mobile terminal may transmit information on the selected seating plan (or information related to the seating plan) to the vehicle control apparatus 800 through the communication unit.

The information on the selected seating plan (or information related to the seating plan) may include at least one among the position, posture, and shape of each of a plurality of seats 840 provided in the vehicle.

Also, the information on the seating plan may be transmitted from the mobile terminal 900 to the vehicle control apparatus 800, when the execute button 1440 outputted to the display 951 of the mobile terminal is selected.

The information on the seating plan may be transmitted to other mobile terminals (S1214). Specifically, the information on the seating plan may be transmitted from the mobile terminal to the vehicle control apparatus 800, and the processor 870 of the vehicle control apparatus 800 may transmit the information on the seating plan to other terminals than the mobile terminal 900a, among the plurality of mobile terminals connected through the communication unit 810.

Here, the plurality of terminals may be terminals that have entered an area within a certain distance from the vehicle—for example, mobile terminals owned by fellow passengers.

As such, the present disclosure may provide a user interface through which information on a confirmed seating plan is shared with other mobile terminals (e.g., fellow passengers' mobile terminals) through a mobile terminal communicating with a vehicle.

Afterwards, in the present disclosure, the inside space of the vehicle is modified to correspond to the selected seating plan (S1216). Specifically, upon receiving information on a seating plan (e.g., 1430c) selected from the display 951 of the mobile terminal 900a through the communication unit 810, the processor 870 may control the seat driving unit 830 such that a seat 840 in the vehicle is placed in a position corresponding to the selected seating plan.

Afterwards, in the present disclosure, it is determined whether a problem occurs or not while modifying the inside space of the vehicle (S1218). If the seat is placed in a preset position, the inside space of the vehicle is modified.

Specifically, in the present disclosure, there may be cases where a seat cannot be placed in a position corresponding to the selected seating plan (or in a preset position).

For example, if there is an object (load) loaded near a seat, or a failure or error occurs to the seat driving unit, the seat may not be placed in a position corresponding to the selected seating plan (or in a preset position).

If a problem occurs while modifying the inside space of the vehicle (or if a seat cannot be placed in a position corresponding to the selected seating plan (or in a preset position), the processor 870 of the present disclosure may transmit alert information to a preset terminal (the mobile terminal 900a) to indicate that a seat cannot be placed in a position corresponding to the selected seating plan (S1210).

In another example, as shown in FIG. 18, if a seat cannot be placed in a position corresponding to the selected seating plan (or in a preset position), the processor 870 may switch on a lamp 1800 of the vehicle in a preset pattern. Here, the switching on of a lamp in a preset pattern may comprise turning on/off a lamp (e.g., emergency lamp) at regular intervals or turning on/off a lamp a given number of times.

Meanwhile, if there is no problem with modifying the inside space of the vehicle, the processor 870 of the present disclosure may perform the step of placing the seat in a position corresponding to the selected seating plan (or in a preset position) and outputting a result of the configuration (or information indicating completion of the configuration as a result of the modification) (S1220).

For example, once a seat 840 in the vehicle is placed in a position corresponding to a seating plan selected through the mobile terminal 900a (or in a preset position), the processor 870 may transmit a result of the configuration to the mobile terminal 900a through the communication unit 810, switch on a lamp arranged in a direction corresponding to an object approaching the vehicle, illuminate the result of the configuration on a road surface, or switch on an interior lamp in the vehicle.

Meanwhile, when an object is approaching the vehicle 100, the processor 870 of the present disclosure may be connected to communicate with the mobile terminal 900a the object is carrying. In this case, if there is a record showing that the mobile terminal 900a has ever been connected through the communication unit 810 (or if it is an authenticated terminal), the processor 870 may place the seat 840 in a seat position (or posture or shape) where the user carrying the mobile terminal 900a once sat.

Here, information about the seat position where the user carrying the mobile terminal 900a once sat may be stored in the memory 140 of the vehicle 100. The seat position where the user carrying the mobile terminal 900a once sat may be a seat position where the user drove the vehicle 100 most recently or a seat position set by the user.

Meanwhile, the object approaching the vehicle 100 may comprise a plurality of users, and there may be a record showing that a plurality of mobile terminals the plurality of users are carrying have ever been connected to the vehicle control apparatus 800 through the communication unit 810.

In this case, the processor 870 may transmit information for selecting a driver to at least one of the plurality of mobile terminals, and, once the driver is selected by one of the plurality of mobile terminals, the seat 840 may be placed in a seat position (or posture or shape) where the user of the mobile terminal that has selected the driver.

Meanwhile, referring to FIG. 16, a seat 1600 provided in the vehicle 100 of the present disclosure may be configured to vary in shape. For example, the processor 870 may control the seat driving unit 830 to decrease an object seating space by expanding the volume of the seat 840 or to increase the object seating space by reducing the volume of the seat 840.

The processor 870 may determine whether a baby or child is included, by using information related to an object(s) approaching the vehicle 100. Here, the baby or child may refer to a user under the age of 7, for example.

If it is determined that a baby or child is included, the processor 870 may determine the age or the baby or child by a server through the communication unit 810. Also, the processor 870 may determine the volume of the baby or child on the basis of an image captured by the camera 820.

Afterwards, if it is determined that the baby or child is in a first age group of the age range of 0 to 7, the processor 870 may increase the volume of the seat by injecting air into the seat and therefore shrink the seating space of the seat, as shown in (a) of FIG. 16.

Also, if it is determined that the baby or child is in a second or third age group of the age range of 0 to 7 which is higher than the first age group, the processor 870 may decrease the volume of the seat by removing air from the seat and therefore enlarge the seating space of the seat 1600, as shown in (b) and (c) of FIG. 16.

That is, the processor 870 may modify the shape of the seat in such a way that the younger the baby or child is or the smaller their volume is, the larger the volume of the seat 1600 (i.e., the narrower the object's seating space), or may modify the shape of the seat in such a way that the older the baby or child is or the larger their volume is, the smaller the volume of the seat 1600 (i.e., the wider the object's seating space).

The processor 870 may vary the shape of the seat (i.e., the volume of the seat) so as to correspond to the volume of a sensed object and the object's seating space in the seat 1600.

In this way, the present disclosure may provide a vehicle that offers an optimized ride comfort and stability by varying the shape of a seat depending on the volume of a sensed object.

FIG. 19 is a control method for explaining a method of how a user manipulates a seat in an optimal manner when boarding a vehicle.

Referring to FIG. 19, the processor 870 provided in the vehicle 100 of the present disclosure may place a seat in a preset position (or position corresponding to a seating plan selected by a mobile terminal) based on information related to an object before a door of the vehicle opens.

Here, as shown in (a) of FIG. 19, a first seat (e.g., one of the back seats) 840*d*, among a plurality of seats 840 in the vehicle, may be set up to seat a user. That is, the first seat 840*d* may be set up to seat a user, based on the preset position (or position corresponding to a seating plan selected by a mobile terminal).

In this case, as shown in (a) of FIG. 19, the processor 870 may allow the backrest of the second seat 840*b* to be tilted in one direction before a door of the vehicle opens, the second seat 840*b* being positioned in front of the first seat 840*d* set up to seat a user.

Here, the one direction may be, for example, a forward direction of the vehicle.

Afterwards, the processor 870 may sense by a sensing unit whether the user 1900 has sat in the first seat or not.

Once the user 1900 sits in the first seat 840*d*, the processor 870 may return the backrest of the second seat 840*b* to its original position or keep it tilted, based on the preset position (or position corresponding to a seating plan selected by a mobile terminal) corresponding to the information related to the object.

For example, if the preset position is a position (or seating plan) set up for a case where the user is about to sit in the second seat 840*b*, the processor 870 may return the backrest of the second seat 840*b* tilted in the one direction to its original position (or tilt it in the opposite direction of the one direction), as shown in (b) of FIG. 19.

In another example, if the preset position is a position (or seating plan) set up for a case where the user is not about to sit in the second seat 840*b*, the processor 870 may keep the backrest of the second seat 840*b* tilted in the one direction, as shown in (c) of FIG. 19.

Afterwards, the backrest of the second seat 840*b* may be returned (or tilted in the opposite direction of the one direction) by an input from the user or by an external force applied by the user.

With this configuration, the present disclosure may provide a vehicle control apparatus capable of controlling the seat driving unit so that a user can sit comfortably in a vehicle when boarding the vehicle.

Figure 20:
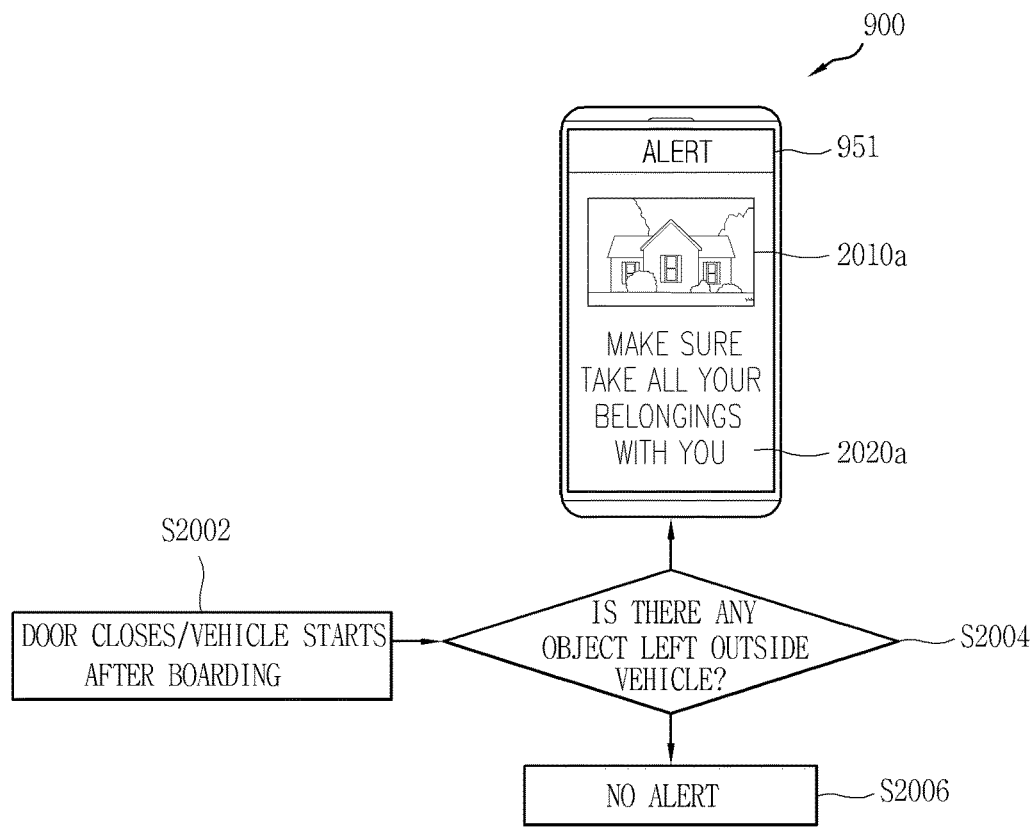
Figure 21:
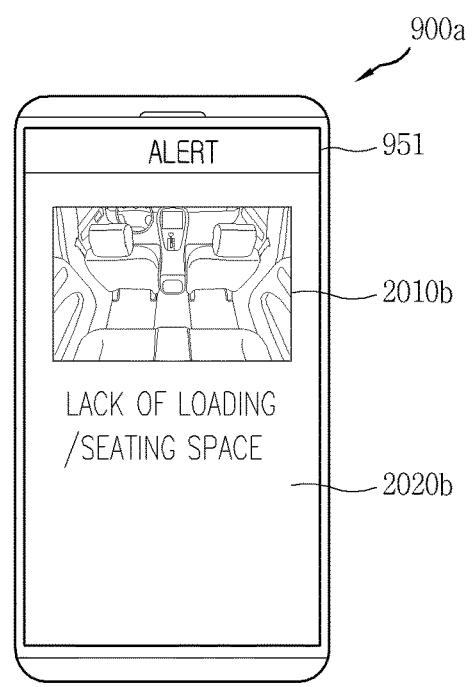

FIGS. 20, 21, and 22 are conceptual diagrams for explaining various control methods using a mobile terminal in accordance with an exemplary embodiment of the present disclosure.

The vehicle control apparatus 800 related to the present disclosure may determine whether there is an unloaded object (load) after a user has boarded the vehicle, and indicate to the user by a mobile terminal whether there is an unloaded object or not.

Referring to FIG. 20, after an object approaching the vehicle boards the vehicle, the processor 870 may sense a door of the vehicle closing (or sense the vehicle starting up or starting to move) (S2002).

Afterwards, when a door of the vehicle closes after the object boards the vehicle (or when the vehicle starts up or the vehicle starts to move), the processor 870 may activate the camera 820 and determine whether there is any object left outside the vehicle 100 by the camera 820 (S2004).

Here, the object left outside the vehicle may refer to some of objects approaching the vehicle (sensed objects) that have not been seated (or loaded) in the vehicle.

Afterwards, if there is no object left outside the vehicle, the processor 870 may not perform a particular task (S2006).

Meanwhile, if there is an object left, the processor 870 may transmit an image captured by the camera 820 and 820*a* provided in the vehicle 100 to the mobile terminal 900 through the communication unit 810 to display the image on the mobile terminal 900.

In this case, as shown in FIG. 20, an image received by the camera 820 of the vehicle control apparatus 800 (i.e., an image transmitted from the communication unit 810 of the vehicle control apparatus 800) 2010*a* and/or alert information 2020*a* may be outputted to the display 951 of the mobile terminal 900.

Meanwhile, referring to FIG. 21, in the present disclosure, if an object approaching the vehicle cannot board the vehicle in its entirety based on a loading space inside the vehicle and information related to the object, information may be outputted using a lamp on the vehicle and the mobile terminal to indicate that the object cannot board the vehicle in its entirety.

Specifically, if it is determined that an object approaching the vehicle cannot board the vehicle in its entirety based on a loading space inside the vehicle and information (e.g., the volume of the object) related to the object, the processor 870 may activate the cameras (e.g., internal cameras 220 and 820*b*) of the vehicle control apparatus 800.

Afterwards, the processor 870 may transmit images captured by the internal cameras 220 and 820*b* to the mobile terminal 900 through the communication unit 810.

In this case, as shown in FIG. 21, an image 2010*b* captured by the internal cameras 220 and 820*b* and/or alert information 2020*b* may be outputted to the display 951 of the mobile terminal 900.

Also, the vehicle control apparatus 800 of the present disclosure enables a parked vehicle 100 to autonomously drive a predetermined distance. That is, the processor 870 may allow a parked vehicle 100 to autonomously drive in a preset pattern if a preset condition is met. As such, the present disclosure allows for driving a parked vehicle out through autonomous driving without the user's driving.

As shown in (a) of FIG. 22, objects approaching the vehicle may include a preset object (e.g., a carrier, a stroller, a wheelchair 2200*c*, a carriage (load) 2200*b* of a preset volume or above, or a baby or child 2200*a*), and there may be a space within a certain distance from the vehicle 100's door or trunk (for example, the object's seating or loading space may be narrow, the user or vehicle may have only a space narrower than a certain distance, or the volume of a sensed object may be larger than a space within a certain distance from the door or trunk. In this case, it may be inconvenient or impossible for the user to sit or put in their load.

In this case, the processor 870 may transmit information 2200 to the mobile terminal 900 to ask whether to autonomously drive the vehicle 100 in a preset manner or not.

Therefore, as shown in (b) of FIG. 22, information asking whether to autonomously drive the vehicle 100 in a preset manner or not may be outputted to the display 951 of the mobile terminal 900.

Afterwards, based on the information, the controller of the mobile terminal 900 may transmit a response to the vehicle control apparatus 800 through the communication unit, asking to autonomously drive the vehicle 100 in a preset manner. In an example, the response may be a response asking to drive the vehicle out a predetermined distance through autonomous driving.

As shown in (c) of FIG. 22, the processor 870 may autonomously drive the vehicle 100 based on the response from the mobile terminal 900. In this case, the processor 870 may autonomously drive the vehicle 100 in such a way that the vehicle 100 can drive out a predetermined distance in a preset manner (or a preset algorithm such as an automatic drive-out algorithm).

With this configuration, the present disclosure may provide a vehicle capable of providing a more optimized seating/loading environment before or after an object is seated/loaded into the vehicle by using a mobile terminal, and a method for controlling the mobile terminal.

In the above, all information outputted to the display of the mobile terminal may be outputted under control of the controller of the mobile terminal.

Moreover, in this specification, all tasks/functions/configurations/control methods performed by the processor 870 of the vehicle 100 may be analogically applied in the same/similar way to the controller of the mobile terminal.

Embodiments of the present disclosure provide one or more of the following advantages.

Firstly, the present disclosure has the advantage of providing a vehicle control apparatus capable of placing a vehicle's seat in an optimal position depending on the object that is about to board the vehicle, and a method for controlling the vehicle.

Secondly, the present disclosure may suggest an optimized seating plan to a user through a mobile terminal depending on the object that is about to board the vehicle, and provide a novel user interface that allows a user to configure a seat through the mobile terminal according to the seating plan the user wants.

It is to be understood that advantageous effects to be achieved by the present disclosure are not limited to the aforementioned advantageous effects and other advantageous effects which are not mentioned herein will be apparent from the following description to one of ordinary skill in the art to which the present disclosure pertains.

The above-explained vehicle control apparatus 800 may be included in the vehicle 100.

Moreover, the operation or control method of the above-explained vehicle control apparatus 800 may be analogically applied in the same/similar way to the operation or control method of the vehicle 100 (or controller 170).

For example, the control method of the vehicle 100 (or the control method of the vehicle control apparatus 800) may comprise the step of capturing an object approaching the vehicle, the step of sensing information related to the object on the basis of an image captured by the camera, and placing a seat in a preset position based on the sensed information related to the object.

The above steps may be performed by the controller 170 of the vehicle 100, as well as by the vehicle control apparatus 800.

Additionally, all functions, configurations, or control methods performed by the above-described vehicle control apparatus 800 may be performed by the controller 170 of the vehicle 100. That is, all of the control methods explained in this speciation may be applied to a control method of a vehicle or a control method of a control device.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet).

The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A vehicle control apparatus, comprising:
a processor configured to:
receive, from a camera of a vehicle, one or more images of one or more objects outside of the vehicle;
determine, based on the received one or more images, information related to at least one object that approaches the vehicle; and
control, based on the information related to the at least one object that approaches the vehicle, a seat driving device to manipulate one or more seats located in the vehicle to a configuration related to the at least one object that approaches the vehicle,
wherein the processor is further configured to:
manipulate, before the at least one object enters the vehicle, a backrest of a first seat to tilt in a forward direction, and
based on the at least one object sitting on a second seat that is behind the first seat, release the backrest of the first seat to an original position.

2. The vehicle control apparatus of claim 1, wherein manipulating the one or more seats by the seat driving device comprises:
moving the one or more seats forward or backward;
moving the one or more seats upward or downward;
tilting a backrest of the one or more seats; and
folding or unfolding the one or more seats.

3. The vehicle control apparatus of claim 1, wherein the information related to the at least one object that approaches the vehicle comprises quantity of objects that approach the vehicle, types of objects that approach the vehicle, and volumes of objects that approach the vehicle, and
wherein controlling the seat driving device to manipulate the one or more seats to the configuration related to the at least one object that approaches the vehicle comprises controlling the seat driving device to manipulate at least one of a position of the one or more seats, a posture of the one or more seats, or a shape of the one or more.

4. The vehicle control apparatus of claim 3, wherein the one or more seats comprise a plurality of seats, and the processor is further configured to determine the position, posture, and shape of each of the plurality of seats based on the information related to the at least one object, and the seat driving device manipulates each of the plurality of seats to the determined position, posture, and shape.

5. The vehicle control apparatus of claim 1, wherein the processor is further configured to, during the manipulation of the one or more seats, turn on one or more lamps of the vehicle.

6. The vehicle control apparatus of claim 5,
wherein the one or more lamps of the vehicle are configured to display information that comprises text, image, and video, and
wherein, based on the one or more seats being manipulated, the one or more lamps of the vehicle are configured to display text information that indicates the one or more seats are being manipulated.

7. The vehicle control apparatus of claim 5,
wherein the one or more lamps of the vehicle are configured to project light on a road surface to display information that comprises text, image, and video, and
wherein, based on the one or more seats being manipulated, the one or more lamps are configured to project light on the road surface to display text information that indicates the one or more seats are being manipulated.

8. The vehicle control apparatus of claim 5, wherein, based on a response from the seat driving device that indicates the one or more seats cannot be manipulated to the configuration, the processor is configured to turn on the one or more lamps in a preset pattern.

9. The vehicle control apparatus of claim 1, further comprising a communication device configured to communicate between the vehicle control apparatus and external electronic devices, wherein the external electronic devices comprise a mobile terminal.

10. The vehicle control apparatus of claim 9, wherein, based on determination of the information related to the at least one object that approaches the vehicle, the processor is further configured to transmit the information related to the at least one object to the mobile terminal through the communication device, and
wherein the information related to the at least one object and the configuration of the one or more seats are outputted to a display of the mobile terminal through the communication device.

11. The vehicle control apparatus of claim 10, wherein the processor is further configured to send, through the communication device, a graphic object that presents a plurality of configurations of the one or more seats to the mobile terminal, and
based on the information related to the at least one object, select one of the plurality of configurations of the one or more seats to be shown on the display of the mobile terminal.

12. The vehicle control apparatus of claim 10, wherein the processor is configured to control, based on one of a plurality of configurations of the one or more seats being selected from the mobile terminal, the seat driving device to manipulate the one or more seats to the selected configuration.

13. The vehicle control apparatus of claim 9, wherein the processor is further configured to:
identify a loading space inside the vehicle based on one or more images of an inside of the vehicle; and
control, based on the identified loading space inside the vehicle, the seat driving device to manipulate the one or more seats to a configuration that allows access to the loading space.

14. The vehicle control apparatus of claim 13, wherein the processor is further configured to transmit, based on a determination that the at least one object that approaches the vehicle cannot be loaded in the loading space of the vehicle, alert information to the mobile terminal through the communication device.

15. The vehicle control apparatus of claim 14, wherein the processor is further configured to determine, based on a minimum dimension among dimensions of the at least one object captured by the camera, whether the at least one object can be loaded in the vehicle or not.

16. The vehicle control apparatus of claim 9, wherein the processor is further configured to control, based on identifications of the mobile terminal and corresponding configuration history of the one or more seats of the vehicle, the seat driving device to manipulate the one or more seats to a latest configuration of the corresponding configuration history.

17. The vehicle control apparatus of claim 9, wherein the processor is further configured to:
determine, based on a door of the vehicle being closed, whether the at least one object that approaches the vehicle is left outside of the vehicle, and
control, based on the determination that the at least one object that approaches the vehicle is left outside of the vehicle, the communication device to transmit, to the mobile terminal through the communication device, an image that is captured by the camera and that shows the at least one object being outside of the vehicle.

18. The vehicle control apparatus of claim 9, wherein, based on a determination that the at least one object that approaches the vehicle includes one or more predefined objects and a determination that a distance between the one or more predefined objects and the vehicle is less than or equal to a predefined value, the processor is further configured to:
control the communication device to send an inquiry to the mobile terminal to ask whether to autonomously drive the vehicle in a preset manner; and
drive the vehicle based on a response to the inquiry from the mobile terminal through the communication device.

19. A vehicle comprising the vehicle control apparatus of claim 1.

* * * * *